（12）United States Patent
Suzuki et al.

(10) Patent No.: US 10,808,960 B2
(45) Date of Patent: *Oct. 20, 2020

(54) REFRIGERATION CYCLE APPARATUS

(71) Applicant: Mitsubishi Electric Corporation, Tokyo (JP)

(72) Inventors: Yasuhiro Suzuki, Tokyo (JP); Masahiko Takagi, Tokyo (JP); Kenyu Tanaka, Tokyo (JP); Kazuki Watanabe, Tokyo (JP); Naoya Matsunaga, Tokyo (JP); Teppei Higuchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/068,958

(22) PCT Filed: Mar. 23, 2016

(86) PCT No.: PCT/JP2016/059085
§ 371 (c)(1),
(2) Date: Jul. 10, 2018

(87) PCT Pub. No.: WO2017/163321
PCT Pub. Date: Sep. 28, 2017

(65) Prior Publication Data
US 2019/0017718 A1    Jan. 17, 2019

(51) Int. Cl.
*F24F 11/36* (2018.01)
*F24F 11/74* (2018.01)
(Continued)

(52) U.S. Cl.
CPC .............. *F24F 11/36* (2018.01); *F24F 3/08* (2013.01); *F24F 11/64* (2018.01); *F24F 11/65* (2018.01);
(Continued)

(58) Field of Classification Search
None
See application file for complete search history.

(56) References Cited

U.S. PATENT DOCUMENTS

2002/0178738 A1    12/2002   Taira et al.
2006/0191318 A1*   8/2006   McBride ............ G01N 33/0009
                                                      73/23.2
(Continued)

FOREIGN PATENT DOCUMENTS

CN    108779948 A    11/2018
EP    2 835 595 A1    2/2015
(Continued)

OTHER PUBLICATIONS

Office Action dated May 20, 2019 issued in corresponding AU patent application No. 2016398548.
(Continued)

*Primary Examiner* — Kenneth M Lo
*Assistant Examiner* — Istiaque Ahmed
(74) *Attorney, Agent, or Firm* — Posz Law Group, PLC

(57) ABSTRACT

A refrigeration cycle apparatus includes a refrigeration cycle circuit which includes a plurality of load-side heat exchangers; a plurality of indoor units which accommodate the plurality of load-side heat exchangers, respectively; and a controller which controls the plurality of indoor units. Each of the plurality of indoor units includes an air-sending fan. At least one of the plurality of indoor units includes a refrigerant detection unit. The controller divides the plurality of indoor units into one or more groups. The controller is set such that when refrigerant is detected by the refrigerant detection unit included in any of the plurality of indoor units, the controller causes the air-sending fans included in all the indoor units which belong to a same group as the indoor unit
(Continued)

which includes the refrigerant detection unit which detects the refrigerant to be operated.

6 Claims, 10 Drawing Sheets

(51) Int. Cl.
| | |
|---|---|
| F24F 11/65 | (2018.01) |
| F24F 11/72 | (2018.01) |
| F25B 49/00 | (2006.01) |
| F25B 49/02 | (2006.01) |
| F25B 13/00 | (2006.01) |
| F24F 11/64 | (2018.01) |
| F24F 3/08 | (2006.01) |
| G05B 19/042 | (2006.01) |

(52) U.S. Cl.
CPC .............. *F24F 11/72* (2018.01); *F24F 11/74* (2018.01); *F25B 13/00* (2013.01); *F25B 49/005* (2013.01); *F25B 49/02* (2013.01); *G05B 19/042* (2013.01); *F25B 2313/0233* (2013.01); *F25B 2313/0253* (2013.01); *F25B 2313/0293* (2013.01); *F25B 2400/075* (2013.01); *F25B 2500/222* (2013.01); *G05B 2219/25252* (2013.01); *G05B 2219/2614* (2013.01)

(56) References Cited

U.S. PATENT DOCUMENTS

| | | | | |
|---|---|---|---|---|
| 2017/0350822 | A1* | 12/2017 | Bower | ................. G01N 27/125 |
| 2018/0283725 | A1* | 10/2018 | Ikawa | ....................... F24F 3/14 |
| 2019/0017718 | A1 | 1/2019 | Suzuki et al. | |

FOREIGN PATENT DOCUMENTS

| | | |
|---|---|---|
| EP | 3 260 791 A1 | 12/2017 |
| EP | 3 346 203 A1 | 7/2018 |
| EP | 3 428 555 A1 | 1/2019 |
| JP | 02-140573 A | 5/1990 |
| JP | 3291407 B | 6/2002 |
| JP | 4599699 B2 | 12/2010 |
| JP | 2013-217550 A | 10/2013 |
| JP | 2017-048993 A | 3/2017 |
| WO | 2016/132906 A1 | 8/2016 |
| WO | 2017/038896 A1 | 3/2017 |
| WO | 2017/154161 A1 | 9/2017 |

OTHER PUBLICATIONS

Office action dated Feb. 20, 2019 issued in corresponding EP patent application No. 16895357.8.
International Search Report dated Jun. 14, 2016 issued in corresponding international patent application No. PCT/JP2016/059085.
Office Action dated Jan. 6, 2020 issued in corresponding CN patent application No. 201680083416.1 (and English translation).
Office Action dated Jul. 16, 2020 issued in corresponding CN patent application No. 201680083416.1 (and English translation).

\* cited by examiner

REFRIGERATION CYCLE APPARATUS

CROSS REFERENCE TO RELATED APPLICATION

This application is a U.S. national stage application of PCT/JP2016/059085 filed on Mar. 23, 2016, the contents of which are incorporated herein by reference.

TECHNICAL FIELD

The present invention relates to a refrigeration cycle apparatus including a plurality of indoor units.

BACKGROUND ART

An air-conditioning apparatus is described in Patent Literature 1. The air-conditioning apparatus includes a gas sensor which is provided on an outer surface of an indoor unit, and detects refrigerant, and a controller which controls an indoor air-sending fan to rotate when the gas sensor detects refrigerant. In the air-conditioning apparatus, when refrigerant leaks into a room through an extension pipe connected to an indoor unit or when refrigerant which has leaked in an indoor unit passes through a gap in a housing of the indoor unit, and flows out to the outside of the indoor unit, the refrigerant can be detected by the gas sensor. Furthermore, when leakage of refrigerant is detected, the indoor air-sending fan is rotated, as a result of which indoor air is sucked through an air inlet provided at the housing of the indoor unit, and air blows into the room through an air outlet. Thus, the refrigerant which has leaked can be diffused.

CITATION LIST

Patent Literature

Patent Literature 1: Japanese Patent No. 4599699

SUMMARY OF INVENTION

Technical Problem

In the air-conditioning apparatus described in Patent Literature 1, when leakage of refrigerant occurs in an indoor unit, an indoor air-sending fan in the indoor unit is rotated. Therefore, in the case where a plurality of indoor units are installed in an indoor space having a relatively large floor area, it is not possible for a single indoor air-sending fan to obtain a sufficient amount of air for the floor area of the indoor space, and there is a possibility that refrigerant which has leaked will not be diffused into the indoor space or be diluted. This will give rise to a problem in which the density of refrigerant in the indoor space may be locally high.

In contrast, there is a case where a plurality of indoor units of an air-conditioning apparatus may be installed in respective indoor spaces into which a single indoor space is partitioned by walls or partitions. In this case, if an indoor air-sending fan in an indoor unit installed in an indoor space other than an indoor space where an indoor unit in which leakage of refrigerant has occurred is installed is rotated, it means that an indoor air-sending fan that does not contribute to diffusion of refrigerant that has leaked is also rotated. Inevitably, power is unnecessarily consumed. This is also a problem.

The present invention has been made to solve at least one of the above problems. An object of the present invention is to provide a refrigeration cycle apparatus that can prevent the density of refrigerant in an indoor space from being locally high even if refrigerant leaks, and also preventing power from being unnecessarily consumed.

Solution to Problem

A refrigeration cycle apparatus according to an embodiment of the present invention includes a refrigeration cycle apparatus including a refrigeration cycle circuit which includes a plurality of load-side heat exchangers; a plurality of indoor units which accommodate the plurality of load-side heat exchangers, respectively; and a controller which controls the plurality of indoor units. Each of the plurality of indoor units includes an air-sending fan. At least one of the plurality of indoor units includes a refrigerant detection unit. The controller divides the plurality of indoor units into one or more groups. The controller is set such that when refrigerant is detected by the refrigerant detection unit included in any of the plurality of indoor units, the controller causes the air-sending fans included in all the indoor units which belong to the same group as the indoor unit which includes the refrigerant detection unit which detects the refrigerant to be operated.

Advantageous Effects of Invention

According to the present invention, even if refrigerant leaks, it is possible to prevent the density of refrigerant in an indoor space from being locally increased, and also prevent unnecessary consumption of power.

DESCRIPTION OF EMBODIMENTS

Embodiment 1

Figure 1:
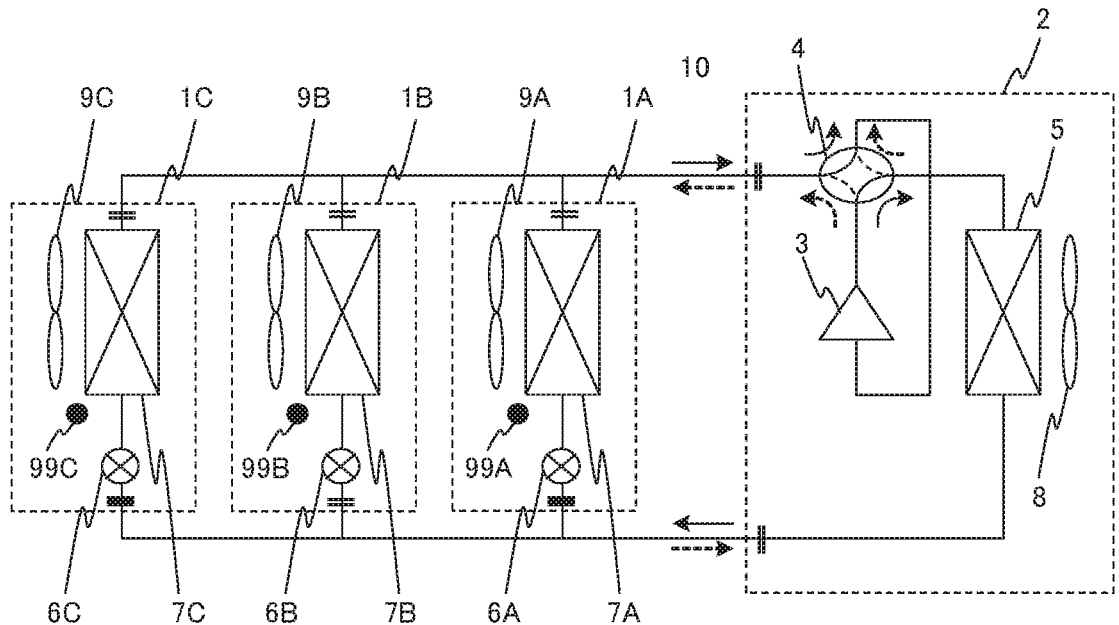
FIG. 1 is a refrigerant circuit diagram illustrating a schematic configuration of an air-conditioning apparatus according to embodiment 1 of the present invention.

A refrigeration cycle apparatus according to embodiment 1 of the present invention will be described. In embodiment 1, a multi-type air-conditioning apparatus provided with a plurality of indoor units is illustrated as an example of a refrigeration cycle apparatus. FIG. 1 is a refrigerant circuit diagram illustrating a schematic configuration of an air-conditioning apparatus according to embodiment 1. As illustrated in FIG. 1, the air-conditioning apparatus includes a refrigeration cycle circuit 10 which circulates refrigerant. In a configuration of the refrigeration cycle circuit 10, for example, a compressor 3, a refrigerant flow switching unit 4, a heat-source-side heat exchanger 5, a plurality of pressure-reducing units 6A, 6B, and 6C, and a plurality of load-side heat exchangers 7A, 7B, and 7C are connected annularly by refrigerant pipes. A couple of the pressure-reducing unit 6A and the load-side heat exchanger 7A, a couple of the pressure-reducing unit 6B and the load-side heat exchanger 7B, and a couple of the pressure-reducing unit 6C and the load-side heat exchanger 7C are connected in parallel to each other in the refrigeration cycle circuit 10. Furthermore, the air-conditioning apparatus includes, as a heat source unit, for example, an outdoor unit 2 installed outdoors. Furthermore, the air-conditioning apparatus includes, as load units, for example, a plurality of indoor units 1A, 1B, and 1C installed indoors. The outdoor unit 2 is connected to the indoor units 1A, 1B, and 1C by extension pipes, which are part of refrigerant pipes.

As refrigerant to be circulated in the refrigeration cycle circuit 10, for example, a slightly flammable refrigerant such as HFO-1234yf or HFO-1234ze or a highly flammable refrigerant such as R290 or R1270 is used. Such a kind of refrigerant may be used as a single refrigerant or a mixed refrigerant containing two or more kinds of refrigerant. Hereinafter, there is a case where a refrigerant having a flammability of a slightly flammable level (for example, 2 L or more according to the classification of ASHRAE 34) is referred to as a "flammable refrigerant". Also, as the refrigerant to be circulated in the refrigeration cycle circuit 10, a non-flammable refrigerant such as R22 or R410A having a non-flammability (for example, 1 according to the classification of ASHRAE 34) can be used. Such a kind of refrigerant has a density higher than air under the atmospheric pressure (for example, at a room temperature [25 degrees Celsius]).

In the outdoor unit 2, at least the heat-source-side heat exchanger 5 is accommodated. In the present embodiment, the compressor 3 and the refrigerant flow switching unit 4 are also accommodated in the outdoor unit 2. Also, an outdoor air-sending fan 8 which supplies outdoor air to the heat-source-side heat exchanger 5 is accommodated in the outdoor unit 2. The outdoor air-sending fan 8 is located to face the heat-source-side heat exchanger 5. When the outdoor air-sending fan 8 is rotated, an air flow which will pass through the heat-source-side heat exchanger 5 is generated. For example, a propeller fan is used as the outdoor air-sending fan 8. For example, the outdoor air-sending fan 8 is located downstream of the heat-source-side heat exchanger 5 in the air flow generated by the outdoor air-sending fan 8.

The compressor 3 is a fluid machinery which compresses sucked low-pressure refrigerant and discharges it as high-pressure refrigerant. The refrigerant flow switching unit 4 changes, in accordance with whether a cooling operation or a heating operation is performed, the direction in which refrigerant flows in the refrigeration cycle circuit 10. For example, a four-way valve or a plurality of two-way valves are used as the refrigerant flow switching unit 4. The heat-source-side heat exchanger 5 is a heat exchanger which functions as a radiator (for example, a condenser) when the cooling operation is performed, and functions as an evaporator when the heating operation is performed. In the heat-source-side heat exchanger 5, heat exchange is carried out between refrigerant flowing in the heat-source-side heat exchanger 5 and outdoor air sent by the outdoor air-sending fan 8.

In the indoor unit 1A, at least the load-side heat exchanger 7A is accommodated. In the present embodiment, the pressure-reducing unit 6A is also accommodated in the indoor unit 1A. Furthermore, an indoor air-sending fan 9A which supplies air to the load-side heat exchanger 7A is accommodated in the indoor unit 1A. A housing of the indoor unit 1A is formed to include an air inlet through which air in an indoor space is sucked and an air outlet through which air blows into the indoor space. When the indoor air-sending fan 9A is rotated, air in the indoor space is sucked through the air inlet. The sucked air passes through the load-side heat exchanger 7A and blows into the indoor space through the air outlet. As the indoor air-sending fan 9A, a centrifugal fan (for example, a sirocco fan, a turbo fan or the like), a cross-flow fan, a diagonal flow fan, an axial flow fan (for example, a propeller fan) or the like is used in accordance with the configuration of the indoor unit 1A. The indoor air-sending fan 9A according to the present embodiment is located upstream of the load-side heat exchanger 7A in the air flow generated by the indoor air-sending fan 9A. The indoor air-sending fan 9A may be located downstream of the load-side heat exchanger 7A.

The pressure-reducing unit 6A decompresses high-pressure refrigerant to change it to low-pressure refrigerant. As the pressure-reducing unit 6A, for example, an electronic expansion valve is applied, which can be controlled in opening degree by the control of a controller 30 to be described later. Also, a temperature-type expansion valve, a fixed expansion unit, an expander or the like may be applied as the pressure-reducing unit 6A.

The load-side heat exchanger 7A is a heat exchanger that functions as an evaporator when the cooling operation is performed, and functions as a radiator (for example, a condenser) when the heating operation is performed. In the load-side heat exchanger 7A, heat exchange is carried out between refrigerant flowing in the load-side heat exchanger 7A and air sent by the indoor air-sending fan 9A.

Furthermore, in the indoor unit 1A, a refrigerant detection unit 99A which detects leakage of refrigerant is provided. The refrigerant detection unit 99A is located, for example, in the housing of the indoor unit 1A. As the refrigerant detection unit 99A, for example, a gas sensor such as a semiconductor gas sensor or a hot-wire-type semiconductor gas sensor is applied. For example, the refrigerant detection unit 99A detects the density of refrigerant in air around the refrigerant detection unit 99A, and outputs a detection signal to the controller 30 to be described later. The controller 30 determines, based on the detection signal from the refrigerant detection unit 99A, whether leakage of refrigerant in the indoor unit 1A occurs or not. Furthermore, as the refrigerant detection unit 99A, an oxygen concentration meter may be applied or a temperature sensor (for example, a thermistor) may be applied. In the case where the temperature sensor is used as the refrigerant detection unit 99A, the refrigerant detection unit 99A detects leakage of refrigerant by detecting reduction of a temperature which is caused by adiabatic expansion of refrigerant that has leaked.

Portions of the indoor unit 1A where leakage of refrigerant may occur are a brazed portion of the load-side heat exchanger 7A and a connection portion of refrigerant pipes. Furthermore, refrigerant for use in embodiment 1 has a higher density than air under the atmospheric pressure. Thus, if leakage of refrigerant occurs in the indoor unit 1A, the refrigerant flows downwards in the housing of the indoor unit 1A. It is therefore desirable that the refrigerant detection unit 99A be provided at a lower position than the load-side heat exchanger 7A and the connection portion in the housing of the indoor unit 1A (for example, at a lower position in the housing). Accordingly, the refrigerant detection unit 99A can reliably detect leakage of refrigerant at least when the indoor air-sending fan 9A is stopped.

As the indoor unit 1A, for example, a floor-mounted type of indoor unit, a ceiling cassette type of indoor unit, a ceiling concealed type of indoor unit, a ceiling suspended type of indoor unit, a wall hung type of indoor unit or the like is applied.

The indoor units 1B and 1C have an equivalent configuration to, for example, that of the indoor unit 1A. To be more specific, the pressure-reducing units 6B and 6C, the load-side heat exchangers 7B and 7C, and the indoor air-sending fans 9B and 9C are accommodated in the indoor units 1B and 1C, respectively, as in the indoor unit 1A. Furthermore, refrigerant detection units 99B and 99C are provided in the indoor units 1B and 1C, respectively, as in the indoor unit 1A.

The controller 30 (not illustrated in FIG. 1) includes a microcomputer (which will be hereinafter referred to as a "micon" as the case may be) including a CPU, a ROM, a RAM, an I/O port, and other units. The controller 30 of the present embodiment controls an operation of the entire air-conditioning apparatus including the indoor units 1A, 1B, and 1C, based on an operation signal from an operation unit (for example, a remote control) to be operated by a user, or detection signals from sensors, or other signals. As described later, the controller 30 of the present embodiment includes an outdoor-unit control unit which is provided at the outdoor unit 2 and a plurality of indoor-unit control units which are provided at the indoor units 1A, 1B, and 1C and can perform communication with the outdoor-unit control unit. The outdoor-unit control unit primarily controls an operation of the outdoor unit 2. The indoor-unit control units primarily control operations of the indoor units 1A, 1B and 1C.

An operation of the refrigeration cycle circuit 10 of the air-conditioning apparatus will be explained. First, an operation to be performed during the cooling operation will be explained. In FIG. 1, the directions in which refrigerant flows during the cooling operation are indicated by arrows drawn by solid lines. During the cooling operation, the flow passage for refrigerant is switched by the refrigerant flow switching unit 4, as illustrated by solid lines in FIG. 1, and the refrigeration cycle circuit 10 is configured to cause low-temperature and low-pressure refrigerant to flow into the load-side heat exchangers 7A, 7B and 7C.

High-temperature and high-pressure gas refrigerant discharged from the compressor 3 passes through the refrigerant flow switching unit 4 and flows into the heat-source-side heat exchanger 5. During the cooling operation, the heat-source-side heat exchanger 5 functions as a condenser. That is, in the heat-source-side heat exchanger 5, heat exchange is carried out between refrigerant flowing in the heat-source-side heat exchanger 5 and outdoor air supplied by the outdoor air-sending fan 8, and heat of condensation is radiated from the refrigerant to the outdoor air. Thereby, the refrigerant which has flowed into the heat-source-side heat exchanger 5 condenses to change to high-pressure liquid refrigerant. After flowing out from the heat-source-side heat exchanger 5, the high-pressure liquid refrigerant flows into the pressure-reducing units 6A, 6B and 6C of the indoor units 1A, 1B and 1C through extension pipes, and is decompressed to change to low-pressure two-phase refrigerant. After flowing out from the pressure-reducing units 6A, 6B and 6C, the low-pressure two-phase refrigerant and 6C flows into the load-side heat exchangers 7A, 7B and 7C. During the cooling operation, the load-side heat exchangers 7A, 7B and 7C function as evaporators. That is, the load-side heat exchangers 7A, 7B and 7C perform heat exchange between refrigerant flowing in the load-side heat exchangers 7A, 7B and 7C and air (for example, indoor air) supplied by the indoor air-sending fans 9A, 9B and 9C, and the refrigerant receives heat of evaporation from the air. Thereby, the refrigerant that has flowed into the load-side heat exchangers 7A, 7B and 7C evaporates to change to low-pressure gas refrigerant or high-quality two-phase refrigerant. Furthermore, the air supplied by the indoor air-sending fans 9A, 9B and 9C is cooled down by a heat removal action of the refrigerant. After flowing out from load-side heat exchangers 7A, 7B and 7C, the low-pressure gas refrigerant or high-quality two-phase refrigerant passes through the extension pipe and the refrigerant flow switching unit 4, and is sucked into the compressor 3. The refrigerant sucked thereinto is compressed to change to high-temperature and high-pressure gas refrigerant. During the cooling operation, the above cycle is performed repeatedly.

Next, an operation to be performed during the heating operation will be explained. In FIG. 1, the directions in which refrigerant flows during the heating operation are indicated by arrows drawn by dotted lines. During the heating operation, the flow passage for refrigerant is switched by the refrigerant flow switching unit 4, as indicated by dotted lines in FIG. 1, and the refrigeration cycle circuit 10 is configured to cause high-temperature and high-pressure refrigerant to flow to the load-side heat exchangers 7A, 7B and 7C.

High-temperature and high-pressure gas refrigerant discharged from the compressor 3 passes through the refrigerant flow switching unit 4 and the extension pipe, and flows into the load-side heat exchangers 7A, 7B and 7C of the indoor units 1A, 1B and 1C. During the heating operation, the load-side heat exchangers 7A, 7B, and 7C function as condensers. That is, in the load-side heat exchangers 7A, 7B, and 7C, heat exchange is carried out between refrigerant flowing in the load-side heat exchangers 7A, 7B and 7C and air supplied by the indoor air-sending fans 9A, 9B and 9C, and heat of condensation is radiated from the refrigerant to air. Thus, the refrigerant that has flowed into the load-side heat exchangers 7A, 7B and 7C condenses to change to high-pressure liquid refrigerant. The high-pressure liquid refrigerant obtained at the load-side heat exchangers 7A, 7B and 7C flows into the pressure-reducing units 6A, 6B and 6C, and is decompressed to change to low-pressure two-phase refrigerant. After flowing out from the pressure-reducing units 6A, 6B and 6C, the low-pressure two-phase refrigerant flows through extension pipes, and flows into the heat-source-side heat exchanger 5 of the outdoor unit 2. During the heating operation, the heat-source-side heat exchanger 5 functions as an evaporator. That is, in the heat-source-side heat exchanger 5, heat exchange is carried out between refrigerant flowing in the heat-source-side heat exchanger 5 and outdoor air supplied by the outdoor air-sending fan 8, and the refrigerant receives heat of evaporation from the outdoor air. Therefore, the refrigerant that has flowed into the heat-source-side heat exchanger 5 evaporates to change to low-pressure gas refrigerant or high-quality two-phase refrigerant. After flowing out from the heat-source-side heat exchanger 5, the low-pressure gas refrigerant or high-quality two-phase refrigerant passes through the refrigerant flow switching unit 4, and is sucked into the compressor 3. The refrigerant sucked thereinto is compressed to change to high-temperature and high-pressure gas refrigerant. During the heating operation, the above cycle is performed repeatedly.

The air-conditioning apparatus according to embodiment 1 is a so-called individual-operation multi-type air-conditioning apparatus in which, for example, all the indoor units 1A, 1B and 1C operate independently of each other in operation modes. During the cooling operation, the indoor units 1A, 1B and 1C perform the cooling operation or stop independently of each other. During the heating operation, the indoor units 1A, 1B and 1C perform the heating operation or stop independently of each other. That is, in the individual-operation multi-type air-conditioning apparatus, only any of the indoor units 1A, 1B and 1C can be operated. In the configuration illustrated in FIG. 1, the indoor units 1A, 1B and 1C cannot perform the cooling operation and the heating operation in a mixed manner. However, although it depends on the configuration of the refrigeration cycle circuit 10, the indoor units 1A, 1B and 1C can be made to perform the cooling operation and the heating operation in a mixed manner.

Figure 2:
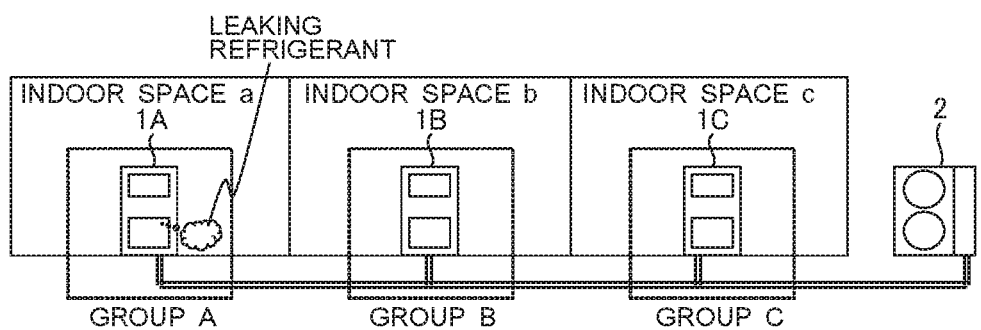
FIG. 2 is a diagram illustrating an example of a manner in which indoor units 1A, 1B, and 1C are installed in the air-conditioning apparatus according to embodiment 1 of the present invention.
Figure 3:
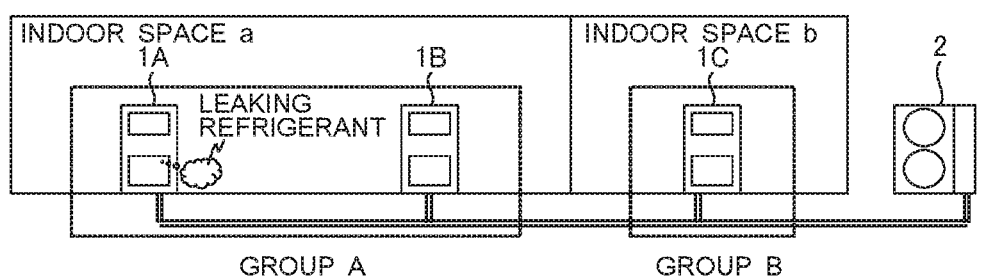
FIG. 3 is a diagram illustrating another example of the manner in which the indoor units 1A, 1B, and 1C are installed in the air-conditioning apparatus according to embodiment 1 of the present invention.
Figure 4:
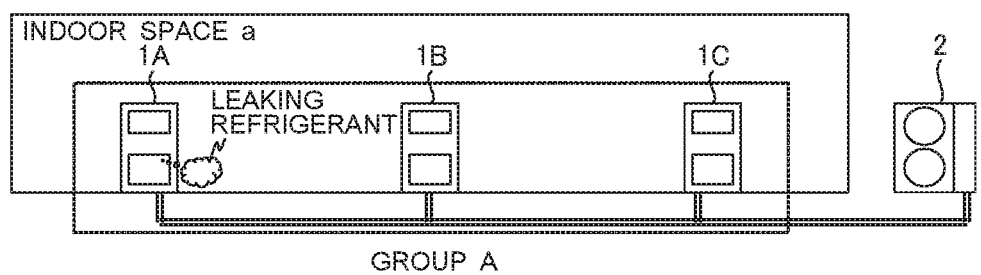
FIG. 4 is a diagram illustrating still another example of the manner in which the indoor units 1A, 1B, and 1C are installed in the air-conditioning apparatus according to embodiment 1 of the present invention.

FIG. 2 is a diagram illustrating an example of the manner in which the indoor units 1A, 1B and 1C are installed in the air-conditioning apparatus according to embodiment 1. FIG. 3 is a diagram illustrating another example of the manner in which the indoor units 1A, 1B and 1C are installed in the air-conditioning apparatus according to embodiment 1. FIG. 4 is a diagram illustrating still another example of the manner in which the indoor units 1A, 1B and 1C are installed in the air-conditioning apparatus according to embodiment 1. It should be noted that FIGS. 2 to 4 illustrate by way of example indoor units 1A, 1B and 1C which are of a floor-mounted type, the indoor units 1A, 1B and 1C may be of a ceiling cassette type, a ceiling concealed type, a ceiling suspended type, or a wall hung type.

In the individual-operation multi-type air-conditioning apparatus, in general, the indoor units 1A, 1B and 1C are installed in indoor spaces a, b, and c, respectively, which are separated from each other by walls or partitions, as illustrated in FIG. 2. However, even in the case of an individual-operation multi-type air-conditioning apparatus, all the indoor units may be installed in a single indoor space with no partitions. In the example illustrated in FIG. 3, the indoor units 1A and 1B are installed in the indoor space a, and the indoor units 1C is installed in the indoor space b which is separated from the indoor space a. In the example illustrated in FIG. 4, all the indoor units 1A, 1B and 1C are installed in the indoor space a.

Figure 5:
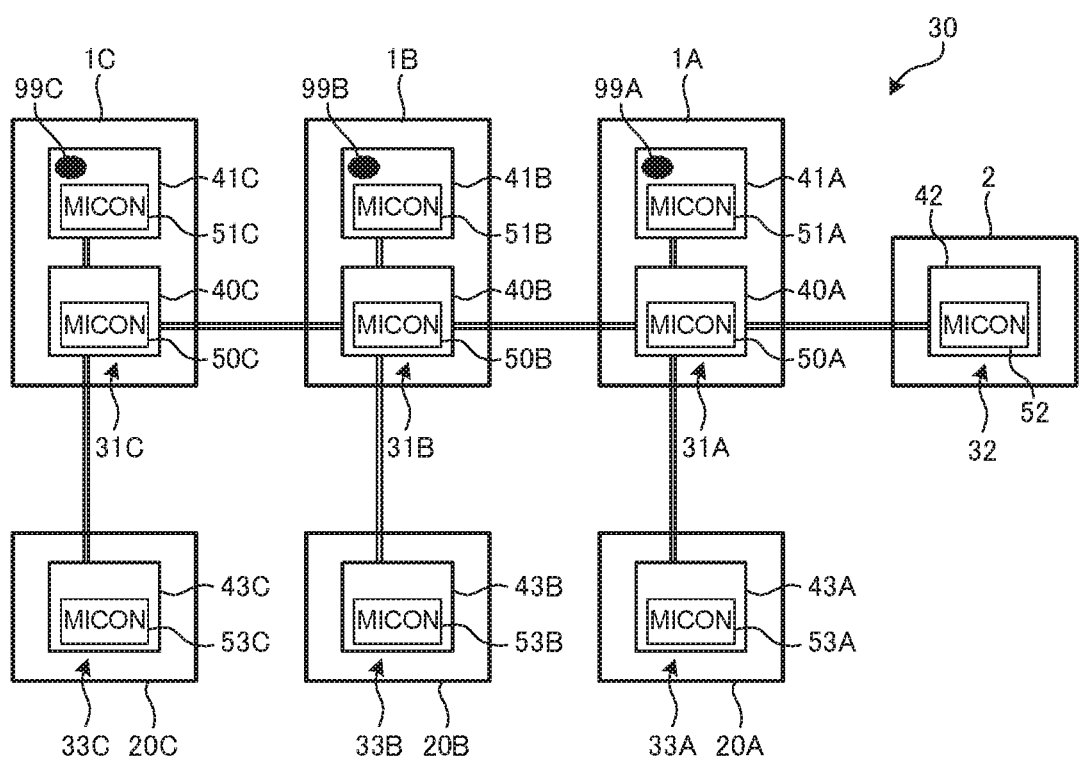
FIG. 5 is a block diagram illustrating a configuration of a controller 30 of the air-conditioning apparatus according to embodiment 1 of the present invention.

FIG. 5 is a block diagram illustrating a configuration of the controller 30 of the air-conditioning apparatus according to embodiment 1. As illustrated in FIG. 5, in embodiment 1, a remote control 20A to be operated for operation of the indoor unit 1A, a remote control 20B to be operated for operation of the indoor unit 1B, and a remote control 20C to be operated for operation of the indoor unit 1C are provided as operation units.

The controller 30 includes the indoor-unit control unit 31A which is mounted in the indoor unit 1A to control the indoor unit 1A, the indoor-unit control unit 31B which is mounted in the indoor unit 1B to control the indoor unit 1B, the indoor-unit control unit 31C which is mounted in the indoor unit 1C to control the indoor unit 1C, the outdoor-unit control unit 32 which is mounted in the outdoor unit 2 to control the outdoor unit 2, a remote-control control unit 33A which is mounted in the remote control 20A to control the remote control 20A, a remote-control control unit 33B which is mounted in the remote control 20B to control the remote control 20B, and a remote-control control unit 33C which is mounted in the remote control 20C to control the remote control 20C.

The indoor-unit control unit 31A includes a control board 40A and a control board 41A which can communicate with the control board 40A via a control line. The indoor-unit control unit 31A can communicate with the indoor-unit control unit 31B, the indoor-unit control unit 31C, the outdoor-unit control unit 32, and the remote-control control units 33A, 33B and 33C via control lines. On the control board 40A, a micon 50A is mounted; and the micon 50A primarily controls an operation of the indoor unit 1A. On the control board 41A, the refrigerant detection unit 99A (for example, a hot-wire-type semiconductor gas sensor) and a micon 51A are non-detachably mounted; and the micon 51A primarily controls the refrigerant detection unit 99A. The refrigerant detection unit 99A of the present embodiment is directly mounted on the control board 41A. However, it suffice that the refrigerant detection unit 99A is non-detachably mounted on the control board 41A. For example, it may be set that the refrigerant detection unit 99A is provided at a position separated from the control board 41A, and a line from the refrigerant detection unit 99A is connected to the control board 41A by soldering or the like. Furthermore, in the present embodiment, although the control board 41A is provided separately from the control board 40A, the control board 41A may be omitted and the refrigerant detection unit 99A may be non-detachably connected on the control board 40A.

The indoor-unit control units 31B and 31C have configurations equivalent to that of the indoor-unit control unit 31A. To be more specific, the indoor-unit control units 31B and 31C include control boards 40B and 40C on which micons 50B and 50C are mounted, and control boards 41B and 41C on which the micons 51B and 51C and the refrigerant detection units 99B and 99C are mounted, respectively.

The outdoor-unit control unit 32 includes a control board 42. On the control board 42, a micon 52 is mounted; and the micon 52 primarily controls an operation of the outdoor unit 2.

The remote-control control unit 33A includes a control board 43A. On the control board 43A, a micon 53A is mounted; and the micon 53A primarily controls the remote control 20A.

Configurations of the remote-control control units 33B and 33C are equivalent to that of the remote-control control unit 33A. To be more specific, the remote-control control units 33B and 33C include control boards 43B and 43C on which micons 53B and 53C are mounted, respectively.

The indoor-unit control units 31A, 31B and 31C, the outdoor-unit control unit 32, and the remote-control control units 33A, 33B and 33C can communicate with each other. In the present embodiment, the indoor-unit control unit 31A is connected to the outdoor-unit control unit 32 and the remote-control control unit 33A by control lines. The indoor-unit control units 31A, 31B and 31C are connected via control lines in a bus-type manner. The indoor-unit control units 31B and 31C are connected to the remote-control control units 33B and 33C, respectively, by control lines.

The micons 51A, 51B and 51C each include a rewritable nonvolatile memory (for example, a flash memory). The nonvolatile memory is provided with a leakage history bit (an example of a leakage history storage area) which stores a history of refrigerant leakage. Leakage history bits of the micons 51A, 51B and 51C may be set to "0" or "1". The initial values of the leakage history bits are "0". That is, when the micons 51A, 51B and 51C are brand-new or the micons 51A, 51B and 51C have no refrigerant leakage histories, the set leakage history bits are "0".

When the refrigerant detection unit 99A detects leakage of refrigerant (for example, when the density of refrigerant detected by the refrigerant detection unit 99A is equal to or greater than a threshold density), the leakage history bit of the micon 51A is rewritten from "0" to "1". Similarly, when the refrigerant detection units 99B and 99C detect leakage of refrigerant, the leakage history bits of the micons 51B and 51C are rewritten from "0" to "1". The leakage history bits of the micons 51A, 51B and 51C are irreversibly rewritable only one way from "0" to "1". Furthermore, the leakage history bits of the micons 51A, 51B and 51C are maintained regardless of whether or not power is supplied to the micons 51A, 51B and 51C.

Furthermore, the memories (nonvolatile memories or volatile memories) of the micons 50A, 50B, 50C, 52, 53A, 53B and 53C are provided with a first leakage history bit corresponding to the leakage history bit of the micon 51A, a second leakage history bit corresponding to the leakage history bit of the micon 51B, and a third leakage history bit corresponding to the leakage history bit of the micon 51C. The first to third leakage history bits of each of the micons 50A, 50B, 50C, 52, 53A, 53B and 53C may be set to "0" or "1". The first to third leakage history bits of each of the micons 50A, 50B, 50C, 52, 53A, 53B and 53C are rewritable two ways between "0" and "1"; i.e., they are rewritable from "0" to "1" and from "1" to "0". The value of the first leakage history bit of each of the micons 50A, 50B, 50C, 52, 53A, 53B and 53C is set to the same value as that of the leakage history bit of the micon 51A which is acquired by communication. The value of the second leakage history bit of each of the micons 50A, 50B, 50C, 52, 53A, 53B and 53C is set to the same value as that of the leakage history bit of the micon 51B which is acquired by communication. The value of the third leakage history bit of each of the micons 50A, 50B, 50C, 52, 53A, 53B and 53C is set to the same value as that of the leakage history bit of the micon 51C which is acquired by communication. Even if power supply is interrupted and the values of the first to third leakage history bit of each of the micons 50A, 50B, 50C, 52, 53A, 53B and 53C are returned to the initial value (for example, "0"), when power supply is resumed, the first to third leakage history bits of the micons 50A, 50B, 50C, 52, 53A, 53B and 53C are re-set to the same values as those of the leakage history bits of the micons 51A, 51B and 51C.

Furthermore, the controller 30 divides the plurality of indoor units 1A, 1B and 1C into one or more groups. One or more groups are formed, for example, for each indoor space, and indoor units installed in the same indoor space are assigned to the same group. For example, as illustrated in FIG. 2, in the case where the indoor unit 1A is installed in the indoor space a, the indoor unit 1B is installed in the indoor space b, and the indoor unit 1C is installed in the indoor space c, the controller 30 assigns the indoor unit 1A to a group A, the indoor unit 1B to a group B, and the indoor unit 1C to a group C. As illustrated in FIG. 3, in the case where the indoor units 1A and 1B are installed in the indoor space a and the indoor unit 1C is installed in the indoor space b, the controller 30 assigns the indoor units 1A and 1B to the group A, and the indoor unit 1C to the group B. As illustrated in FIG. 4, in the case where all the indoor units 1A, 1B and 1C are installed in the indoor space a, the controller 30 assigns all the indoor units 1A, 1B and 1C to the group A.

The grouping operation is carried out by, for example, a specific operation using the remote controls 20A, 20B and 20C by the user or a worker who installs the air-conditioning apparatus. Information on the grouping is stored in micons or the like in the indoor-unit control units 31A, 31B and 31C in association with the first to third leakage history bits. Alternatively, display switches may be provided as operation units specific for the grouping, on the control boards of the indoor-unit control units 31A, 31B and 31C or the control boards of the remote-control control units 33A, 33B and 33C.

For example, as illustrated in FIG. 3, the indoor units 1A and 1B are assigned to group A, and the indoor unit 1C is assigned to the group B. In this case, the indoor-unit control unit 31A of the indoor unit 1A recognizes that the indoor unit 1B associated with the second leakage history bit belongs to the same group as the indoor unit 1A, and the indoor unit 1C associated with the third leakage history bit belongs to a group different from the group to which the indoor unit 1A belongs. The indoor-unit control unit 31B of the indoor unit 1B recognizes that the indoor unit 1A associated with the first leakage history bit belongs to the same group as the indoor unit 1B, and the indoor unit 1C associated with the third leakage history bit belongs to a group different from the group to which the indoor unit 1B belongs. The indoor-unit control unit 31C of the indoor unit 1C recognizes that both the indoor unit 1A associated with the first leakage history bit and the indoor unit 1B associated with the second leakage history bit belong to a group different from the group to which the indoor unit 1C belongs.

When both the first and second leakage history bits of the micon 50A (that is, leakage history bits associated with the indoor units 1A and 1B which belong to the group A) are set to "0", the indoor-unit control unit 31A performs normal control over the indoor unit 1A regardless of the value of the third leakage history bit (that is, a leakage history bit associated with the indoor unit 1C which belongs to a group different from the group A). When the indoor unit 1A is in this state, it performs a normal driving operation and a stop operation based on an operation of the remote control 20A or another device. In contrast, when any of the first and second leakage history bits of the micon 50A is set to "1", the indoor-unit control unit 31A controls the indoor air-sending fan 9A to be forcibly operated, regardless of the value of the third leakage history bit. To be more specific, when the indoor unit 1A is operating, the operation of the indoor air-sending fan 9A is continued, and when the indoor unit 1A is in a stopped state, the operation of the indoor air-sending fan 9A is started. The operation of the indoor air-sending fan 9A is continued as long as, for example, any of the first and second leakage history bits of the micon 50A is set to "1".

When both the first and second leakage history bits of the micon 50B are set to "0", the indoor-unit control unit 31B performs normal control over the indoor unit 1B regardless of the value of the third leakage history bit. When the indoor unit 1B is in this state, it performs a normal driving operation and a stop operation based on an operation of the remote control 20B or another device. In contrast, when any of the first and second leakage history bits of the micon 50B is set to "1", the indoor-unit control unit 31B controls the indoor air-sending fan 9B to be forcibly operated, regardless of the value of the third leakage history bit. To be more specific, when the indoor unit 1B is operating, the operation of the indoor air-sending fan 9B is continued, and when the indoor unit 1B is in a stopped state, the operation of the indoor air-sending fan 9B is started. The operation of the indoor air-sending fan 9B is continued as long as, for example, any of the first and second leakage history bits of the micon 50B is set to "1".

When the third leakage history bit of the micon 50C (that is, a leakage history bit associated with the indoor unit 1C which belongs to the group B) is set to "0", the indoor-unit control unit 31C performs normal control over the indoor unit 1C regardless of the values of the first and second leakage history bits (that is, leakage history bits associated with the indoor units 1A and 1B which belong to a group different from the group B). When the indoor unit 1C is in this state, it performs a normal driving operation and a stop operation based on an operation of the remote control 20C or another device. In contrast, when the third leakage history bit of the micon 50C is set to "1", the indoor-unit control unit 31C controls the indoor air-sending fan 9C to be forcibly operated, regardless of the values of the first and second leakage history bits. To be more specific, when the indoor unit 1C is operating, the operation of the indoor air-sending fan 9C is continued, and when the indoor unit 1C is in a stopped state, the operation of the indoor air-sending fan 9C is started. The operation of the indoor air-sending fan 9C is continued as long as, for example, the third leakage history bit of the micon 50C is set to "1".

In the case where the first to third leakage history bits of the micon 52 are all set to "0", the outdoor-unit control unit 32 performs normal control over the outdoor unit 2. In contrast, in the case where any of the first to third leakage history bits of the micon 52 is set to "1", for example, the outdoor-unit control unit 32 performs control for stopping the compressor 3 or control for inhibiting the compressor 3 from being operated. Such a control is continued as long as any of the first to third leakage history bits of the micon 52 is set to "1".

When the first to third leakage history bits of the micon 53A are all set to "0", the remote-control control unit 33A performs normal control over the remote control 20A. In contrast, when any of the first to third leakage history bits of the micon 53A is set to "1", for example, the remote-control control unit 33A causes the display unit provided at the remote control 20A to display information including the type of abnormality or a treatment method (for example, a character message such as the message "Refrigerant is leaking. Please contact a service person" or an abnormality code). At this time, the remote-control control unit 33A may cause the display unit to display information on the position where leakage of refrigerant has occurred, in accordance with which one of the first to third leakage history bits the value is set to "1". For example, when the first leakage history bit is set to "1", information indicating that leakage of refrigerant has occurred in the indoor unit 1A is displayed; when the second leakage history bit is set to "1", information indicating that leakage of refrigerant has occurred in the indoor unit 1B is displayed; and when the third leakage history bit is set to "1", information indicating that leakage of refrigerant has occurred in the indoor unit 1C is displayed. Such display is continued as long as any of the first to third leakage history bits of the micon 53A is set to "1". Furthermore, the remote-control control unit 33A may cause a voice output unit provided at the remote control 20A to indicate in voice, information including the type of abnormality, a treatment method or the position where leakage of refrigerant has occurred.

When the first to third leakage history bits of the micon 53B are all set to "0", the remote-control control unit 33B performs normal control over the remote control 20B. In contrast, when any of the first to third leakage history bits of the micon 53B is set to "1", for example, the remote-control control unit 33B causes the display unit provided at the remote control 20B to display information including the type of abnormality or a treatment method. At this time, the remote-control control unit 33B may display information on the position where leakage of refrigerant has occurred, in accordance with which one of the first to third leakage history bits the value is set to "1". Such display is continued as long as any of the first to third leakage history bits of the micon 53B is set to "1". Furthermore, the remote-control control unit 33B may cause a voice output unit provided at the remote control 20B to indicate in voice, information including the type of abnormality, a treatment method, or the position where leakage of refrigerant has occurred.

When the first to third leakage history bits of the micon 53C are all set to "0", the remote-control control unit 33C performs normal control over the remote control 20C. In contrast, when any of the first to third leakage history bits of the micon 53C is set to "1", for example, the remote-control control unit 33C causes the display unit provided at the remote control 20C to display information including the type of abnormality or a treatment method. At this time, the remote-control control unit 33C may cause the display unit to display information on the position where leakage of refrigerant has occurred, in accordance with which one of the first to third leakage history bits the value is set to "1". Such display is continued as long as any of the first to third leakage history bits of the micon 53C is set to "1". Furthermore, the remote-control control unit 33C may cause a voice output unit provided at the remote control 20C to indicate in voice in voice, information including the type of abnormality, a treatment method or the position where leakage of refrigerant has occurred.

With the above configuration, if leakage of refrigerant occurs in the indoor unit 1A as illustrated in FIG. 3, the refrigerant detection unit 99A of the indoor unit 1A detects the leakage of refrigerant. When the leakage of refrigerant is detected by the refrigerant detection unit 99A, the micon 51A irreversibly rewrites the leakage history bit from the initial value "0" to "1". When the leakage history bit of the micon 51A is set to "1", the first leakage history bit of each of the micons 50A, 50B, 50C, 52, 53A, 53B and 53C is also rewritten from "0" to "1". Accordingly, in the case where the indoor units 1A and 1B are assigned to the group A, and the indoor unit 1C is assigned to the group B, forced operation of the indoor air-sending fans 9A and 9B, stopping of the compressor 3, inhibition of operation of the compressor 3, display of information on the display unit of the remote controls 20A, 20B and 20C, etc., are performed. Since the indoor unit 1C is assigned to a group different from the group to which the indoor unit 1A is assigned, forced operation of the indoor air-sending fan 9C is not performed.

When leakage of refrigerant occurs in the indoor unit 1B, the refrigerant detection unit 99B detects the leakage of refrigerant. When the leakage of refrigerant is detected by the refrigerant detection unit 99B, the micon 51B irreversibly rewrites the leakage history bit from the initial value "0" to "1". When the leakage history bit of the micon 51B is set to "1", the second leakage history bit of each of the micons 50A, 50B, 50C, 52, 53A, 53B and 53C is also rewritten from "0" to "1". Accordingly, in the case where the indoor units 1A and 1B are assigned to the group A, and the indoor unit 1C is assigned to the group B, forced operation of the indoor air-sending fans 9A and 9B, stopping of the compressor 3, inhibition of operation of the compressor 3, display of information on the display unit of the remote controls 20A, 20B and 20C, etc., are performed. Since the indoor unit 1C is assigned to a group different from the group to which the indoor unit 1B is assigned, forced operation of the indoor air-sending fan 9C is not performed.

When leakage of refrigerant occurs in the indoor unit 1C, the refrigerant detection unit 99C detects the leakage of refrigerant. When the leakage of refrigerant is detected by the refrigerant detection unit 99C, the micon 51C irreversibly rewrites the leakage history bit from the initial value "0" to "1". When the leakage history bit of the micon 51C is set to "1", the third leakage history bit of each of the micons 50A, 50B, 50C, 52, 53A, 53B and 53C is also rewritten from "0" to "1". Accordingly, in the case where the indoor units 1A and 1B are assigned to the group A, and the indoor unit 1C is assigned to the group B, forced operation of the indoor air-sending fan 9C, stopping of the compressor 3, inhibition of operation of the compressor 3, display of information on the display unit of the remote control 20, etc., are performed. Since the indoor units 1A and 1B are assigned to a group different from the group to which the indoor unit 1C is assigned, forced operation of the indoor air-sending fans 9A and 9B is not performed.

In repairing of a portion where leakage of refrigerant has occurred, a service person who is contacted by the user replaces the control board 41A, 41B or 41C at which leakage of refrigerant has been detected, with a new one. This is because if only repairing of the portion where the leakage of refrigerant has occurred is carried out, the leakage history bit of the micon 51A, 51B or 51C is kept at "1", and thus the air-conditioning apparatus cannot perform a normal operation. Since the refrigerant detection units 99A, 99B and 99C are non-detachably connected to the control boards 41A, 41B and 41C, in order to replace the control board 41A, 41B or 41C with a new one, the refrigerant detection unit 99A, 99B or 99C that is exposed to refrigerant atmosphere is also replaced with a new one.

The leakage history bit of the micon 51A, 51B or 51C mounted on the new control board 41A, 41B, or 41C is set to the initial value "0". Therefore, the leakage history bit of each of the micons 50A, 50B, 50C, 52, 53A, 53B and 53C is rewritten from "1" to "0". Accordingly, the air-conditioning apparatus can perform a normal operation.

In embodiment 1, when leakage of refrigerant occurs in the indoor unit 1A, the refrigerant detection unit 99A of the indoor unit 1A detects the leakage of refrigerant. Information indicating that the leakage of refrigerant has occurred in the indoor unit 1A is transmitted from the indoor-unit control unit 31A to the other indoor-unit control units 31B and 31C, the outdoor-unit control unit 32, and the remote-control control units 33A, 33B and 33C via control lines. Accordingly, the indoor-unit control unit 31A shares the information indicating that the leakage of refrigerant has occurred, with the other indoor-unit control units 31B and 31C, the outdoor-unit control unit 32, and the remote-control control units 33A, 33B and 33C. The indoor-unit control units 31A, 31B and 31C determine whether or not to forcibly operate the indoor air-sending fans 9A, 9B and 9C, based on the information indicating that leakage of refrigerant has occurred in the indoor unit 1A and information on the grouping. The unit in which the leakage of refrigerant has occurred is the indoor unit 1A, and the indoor unit in which the leakage of refrigerant has occurred obviously belongs to the same group as the indoor unit 1A. Therefore, the indoor-unit control unit 31A controls the indoor air-sending fan 9A to be forcibly operated. The indoor unit 1A in which the leakage of refrigerant has occurred belongs to the same group as the indoor unit 1B, and therefore, the indoor-unit control unit 31B controls the indoor air-sending fan 9B to be forcibly operated. In contrast, the indoor unit 1A in which the leakage of refrigerant has occurred belongs to a group different from the group to which the indoor unit 1C belongs, and therefore, the indoor-unit control unit 31C performs normal control; it does not perform control for causing the indoor air-sending fan 9C to be forcibly operated.

In embodiment 1, information indicating that leakage of refrigerant has occurred in an indoor unit is shared among all the indoor-unit control units 31A, 31B and 31C. However, the present invention is not limited to this. It may be set that information indicating that leakage of refrigerant has occurred in an indoor unit is shared only with an indoor-unit control unit that controls the indoor unit in which the leakage of refrigerant has occurred and an indoor-unit control unit that controls an indoor unit which belongs to the same group as the indoor unit in which the leakage of refrigerant has occurred, and is not shared with an indoor-unit control unit that controls an indoor unit which belongs to a group different from the group of the indoor unit in which the leakage of refrigerant has occurred.

Furthermore, in embodiment 1, an indoor unit which belongs to a group different from the group of an indoor unit in which leakage of refrigerant has occurred performs a normal operation without controlling an indoor air-sending fan to be forcibly operated. However, the present invention is not limited to this. It may be set that the above indoor unit which belongs to the group different from the group of the indoor unit in which the leakage of refrigerant has occurred does not accept an operation of a remote control to be operated by the user, whereby a normal operation cannot be performed. That is, in the above indoor unit that belongs to the different group from the group of the indoor unit in which leakage of refrigerant has occurred, although a forced operation of an indoor air-sending fan is not performed, information indicating that leakage of refrigerant has occurred in a given indoor unit is displayed on a display unit of the remote control, and a normal operation cannot be operated. Therefore, a user who is present in an indoor space in which leakage of refrigerant has not occurred can also be informed of occurrence of leakage of refrigerant.

As described above, in embodiment 1, in the case where the indoor units 1A, 1B and 1C are installed as illustrated in FIG. 2, when leakage of refrigerant occurs in the indoor unit 1A that is installed in the indoor space a, the indoor air-sending fans 9B and 9C of the indoor units 1B and 1C which are assigned to groups different from the group of the indoor unit 1A can be caused not to operate. Since the indoor units 1B and 1C are installed in the indoor spaces b and c that are different from the indoor space a, even if indoor air-sending fans 9B and 9C are forcibly operated, refrigerant that has leaked in the indoor unit 1A cannot be diffused. Therefore, according to embodiment 1, it is possible to prevent a forced operation of an indoor air-sending fan that does not contribute to diffusion of refrigerant that has leaked, and also prevent unnecessary consumption of power.

Furthermore, in embodiment 1, in the case where the indoor units 1A, 1B and 1C are installed as illustrated in FIG. 3, when leakage of refrigerant occurs in the indoor unit 1A that is installed in the indoor space a, the indoor air-sending fan 9C of the indoor unit 1C which is assigned to a group different from the group of the indoor unit 1A in which the leakage of refrigerant has occurred can be caused not to operate. Since the indoor unit 1C is installed in the indoor space b that is different from the indoor space a, even if the indoor air-sending fan 9C is forcibly operated, refrigerant that has leaked in the indoor unit 1A cannot be diffused. Therefore, according to embodiment 1, it is possible to prevent a forced operation of an indoor air-sending fan that does not contribute to diffusion of refrigerant that has leaked, and also prevent unnecessary consumption of power.

Furthermore, in the case where the indoor units 1A and 1B and/or 1C are installed as illustrated in FIG. 3 or FIG. 4, generally, the indoor space a in which they are installed is a large space with a great floor size. Therefore, when leakage of refrigerant occurs in the indoor unit 1A, even if only the indoor air-sending fan 9A of the indoor unit 1A is forcibly operated, there is a case where it is not possible to obtain a necessary amount of air in order to diffuse refrigerant that has leaked, in the indoor space.

In contrast, in embodiment 1, for example, when leakage of refrigerant occurs in the indoor unit 1A, it is possible to operate not only the indoor air-sending fan 9A of the indoor unit 1A in which the leakage of refrigerant has occurred, but indoor air-sending fans of other indoor units which belong to the same group as the indoor unit 1A. Accordingly, even in the case where the floor area of an indoor space is great, refrigerant which has leaked can be sufficiently diffused in the indoor space. Therefore, even if leakage of refrigerant occurs, it is possible to prevent the density of refrigerant in the indoor space being locally increased. It is therefore possible to prevent the density of refrigerant in the indoor space from being increased to an allowable value or more. In addition, even in the case where a flammable refrigerant is applied, it is possible to prevent a flammable density region from being provided in the indoor space.

Furthermore, in embodiment 1, when leakage of refrigerant occurs in any of the indoor units 1A, 1B and 1C, the indoor air-sending fans of all indoor units which belong to the same group as the indoor unit in which the leakage of refrigerant has occurred start to be driven. Accordingly, since a sudden driving start operation, which is different from the normal operation, is performed in one or more indoor units installed in an indoor space, a larger number of people can be informed of occurrence of abnormality which is leakage of refrigerant. It is therefore possible to more reliably handle it, for example, open a window.

Furthermore, in embodiment 1, for example, when leakage of refrigerant occurs in the indoor unit 1A, the refrigerant detection unit 99A detects the leakage of refrigerant, and a leakage history of refrigerant is irreversibly written to the nonvolatile memory of the control board 41A. To reset the leakage history of refrigerant, the control board 41A needs to be replaced with another control board that has no leakage history. When the control board 41A is replaced, the refrigerant detection unit 99A, which is non-detachably connected, is also replaced. It is therefore possible to prevent continuously using of the refrigerant detection unit 99A which is exposed to refrigerant atmosphere and whose detection characteristics has been changed. Also in this case, in embodiment 1, the operation of the air-conditioning apparatus cannot be resumed until the control board 41A is replaced. Therefore, the operation of the air-conditioning apparatus which has not yet been repaired at the portion where leakage of refrigerant has occurred can be prevented from be resumed by a human error or from being intentionally resumed.

The air-conditioning apparatus according to embodiment 1 is not limited to the system configurations as illustrated in FIGS. 1 to 5. Modifications of the system configuration of the air-conditioning apparatus will be described below.

(Modification 1)

Figure 6:
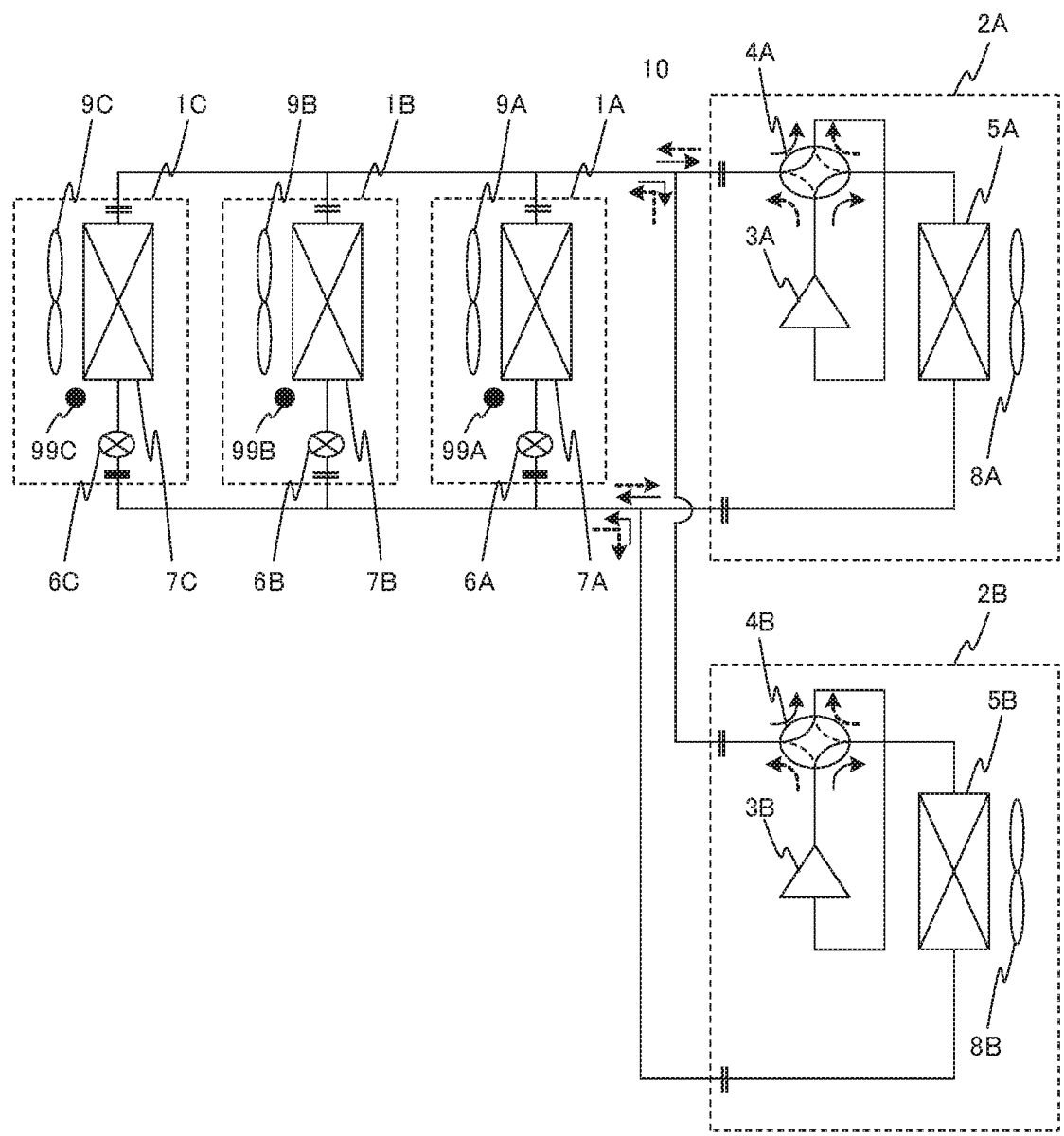
FIG. 6 is a refrigerant circuit diagram illustrating a schematic configuration of an air-conditioning apparatus according to modification 1 of embodiment 1 of the present invention.

FIG. 6 is a refrigerant circuit diagram illustrating a schematic configuration of an air-conditioning apparatus according to modification 1 of embodiment 1. As illustrated in FIG. 6, the air-conditioning apparatus according to modification 1 includes a plurality of outdoor units 2A and 2B. The outdoor units 2A and 2B are provided in parallel to each other in the refrigeration cycle circuit 10. The compressor 3A, the refrigerant flow switching unit 4A, the heat-source-side heat exchanger 5A, and the outdoor air-sending fan 8A are accommodated in the outdoor unit 2A. The compressor 3B, the refrigerant flow switching unit 4B, the heat-source-side heat exchanger 5B, and the outdoor air-sending fan 8B are accommodated in the outdoor unit 2B. Although its illustration is omitted, an outdoor-unit control unit provided in each of the outdoor units 2A and 2B is connected to the indoor-unit control units 31A, 31B and 31C and the remote-control control units 33A, 33B and 33C such that the outdoor-unit control unit can communicate with the indoor-unit control units 31A, 31B and 31C and the remote-control control units 33A, 33B and 33C. The other configurations are similar to those illustrated in FIGS. 1 to 5. Also in modification 1, advantages equivalent to those obtained with the configurations illustrated in FIGS. 1 to 5 can be obtained.

(Modification 2)

Figure 7:
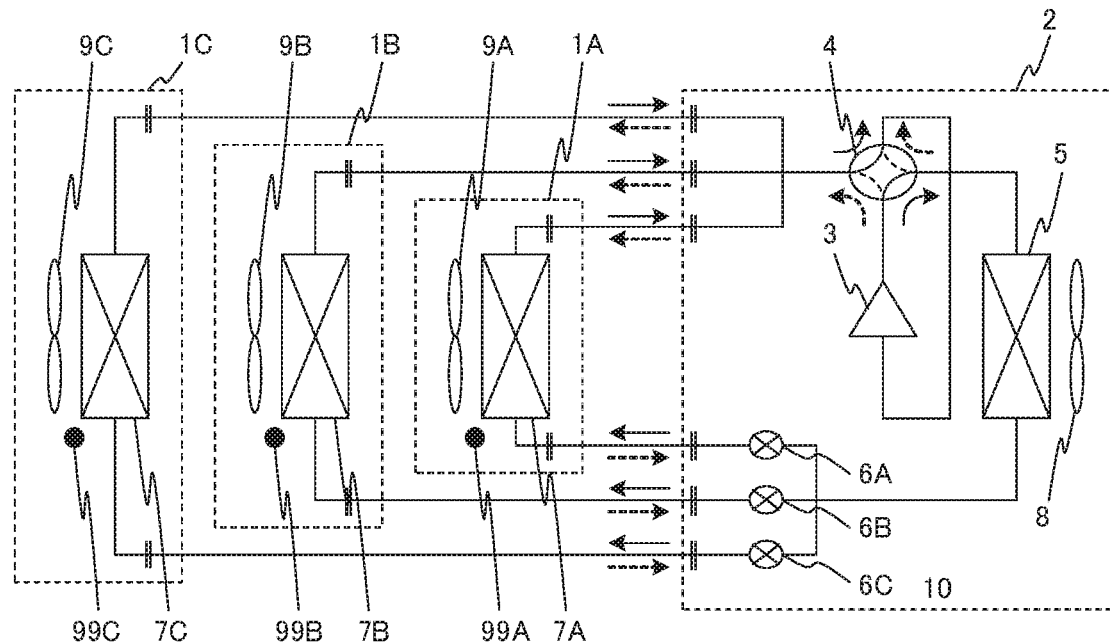
FIG. 7 is a refrigerant circuit diagram illustrating a schematic configuration of an air-conditioning apparatus according to modification 2 of embodiment 1 of the present invention.

FIG. 7 is a refrigerant circuit diagram illustrating a schematic configuration of an air-conditioning apparatus according to modification 2 of embodiment 1. As illustrated in FIG. 7, the air-conditioning apparatus according to modification 2 is different from the configurations as illustrated in FIGS. 1 to 5 on the point that the pressure-reducing units 6A, 6B and 6C the number of which is equal to that of the indoor units 1A, 1B and 1C are accommodated in the outdoor unit 2. The other configurations are similar to those illustrated in FIGS. 1 to 5. Also in modification 2, advantages equivalent to those obtained with the configurations as illustrated in FIGS. 1 to 5 can be obtained.

(Modification 3)

Figure 8:
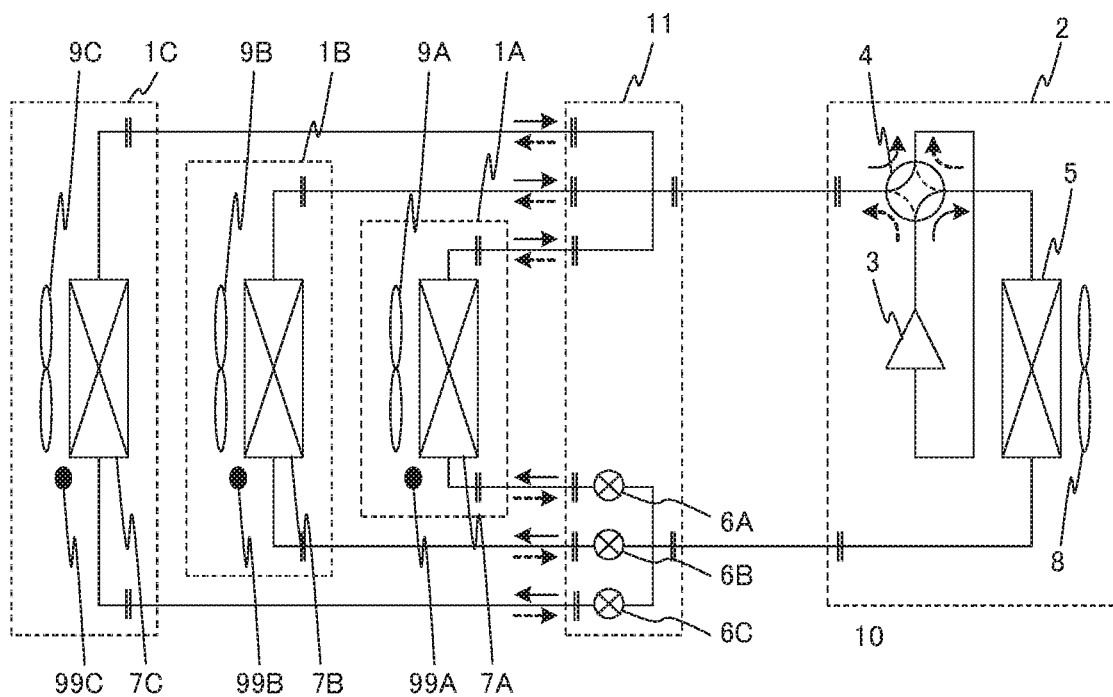
FIG. 8 is a refrigerant circuit diagram illustrating a schematic configuration of an air-conditioning apparatus according to modification 3 of embodiment 1 of the present invention.

FIG. 8 is a refrigerant circuit diagram illustrating a schematic configuration of an air-conditioning apparatus according to modification 3 of embodiment 1. As illustrated in FIG. 8, the air-conditioning apparatus according to modification 3 is different from the configurations illustrated in FIGS. 1 to 5 on the point that in the refrigeration cycle circuit 10, a branching unit 11 is provided to be interposed between each of the indoor units 1A, 1B and 1C and the outdoor unit 2. The branching unit 11 is provided in, for example, space above the ceiling, which is located in a building, but is different from an indoor space. In the branching unit 11, a refrigerant pipe from the outdoor unit 2 is branched in such a manner as to correspond to the indoor units 1A, 1B and 1C. Also, in the branching unit 11, the pressure-reducing units 6A, 6B and 6C the number of which is equal to the number of the indoor units 1A, 1B and 1C are accommodated. Although its illustration is omitted, the branching unit 11 may include a controller which controls the pressure-reducing units 6A, 6B and 6C. The controller is connected to the indoor-unit control units 31A, 31B and 31C, the outdoor-unit control unit 32 and the remote-control control units 33A, 33B and 33C such that the controller can communicate with the indoor-unit control units 31A, 31B and 31C, the outdoor-unit control unit 32 and the remote-control control units 33A, 33B and 33C. The other configurations are similar to those illustrated in FIGS. 1 to 5. Also in modification 3, advantages equivalent to those obtained with the configurations illustrated in FIGS. 1 to 5 can be obtained.

(Modification 4)

Figure 9:
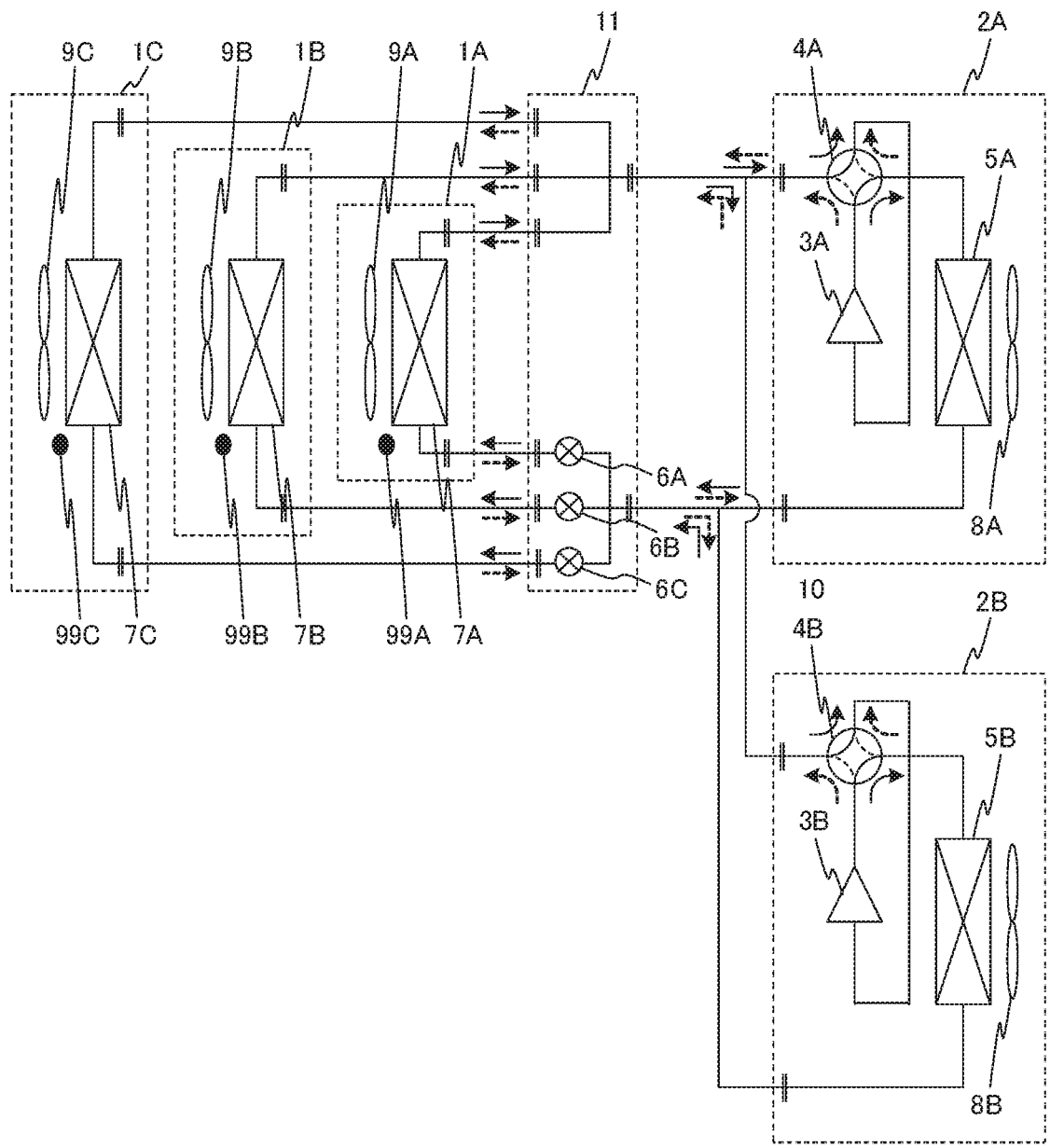
FIG. 9 is a refrigerant circuit diagram illustrating a schematic configuration of an air-conditioning apparatus according to modification 4 of embodiment 1 of the present invention.

FIG. 9 is a refrigerant circuit diagram illustrating a schematic configuration of an air-conditioning apparatus according to modification 4 of embodiment 1. As illustrated in FIG. 9, the air-conditioning apparatus according to modification 4 is different from modification 3 on the point that the air-conditioning apparatus includes the plurality of outdoor units 2A and 2B. The other configurations are similar to those of modification 3. Also in modification 4, advantages equivalent to those obtained with the configurations as illustrated in FIGS. 1 to 5 can be achieved.

(Modification 5)

Figure 10:
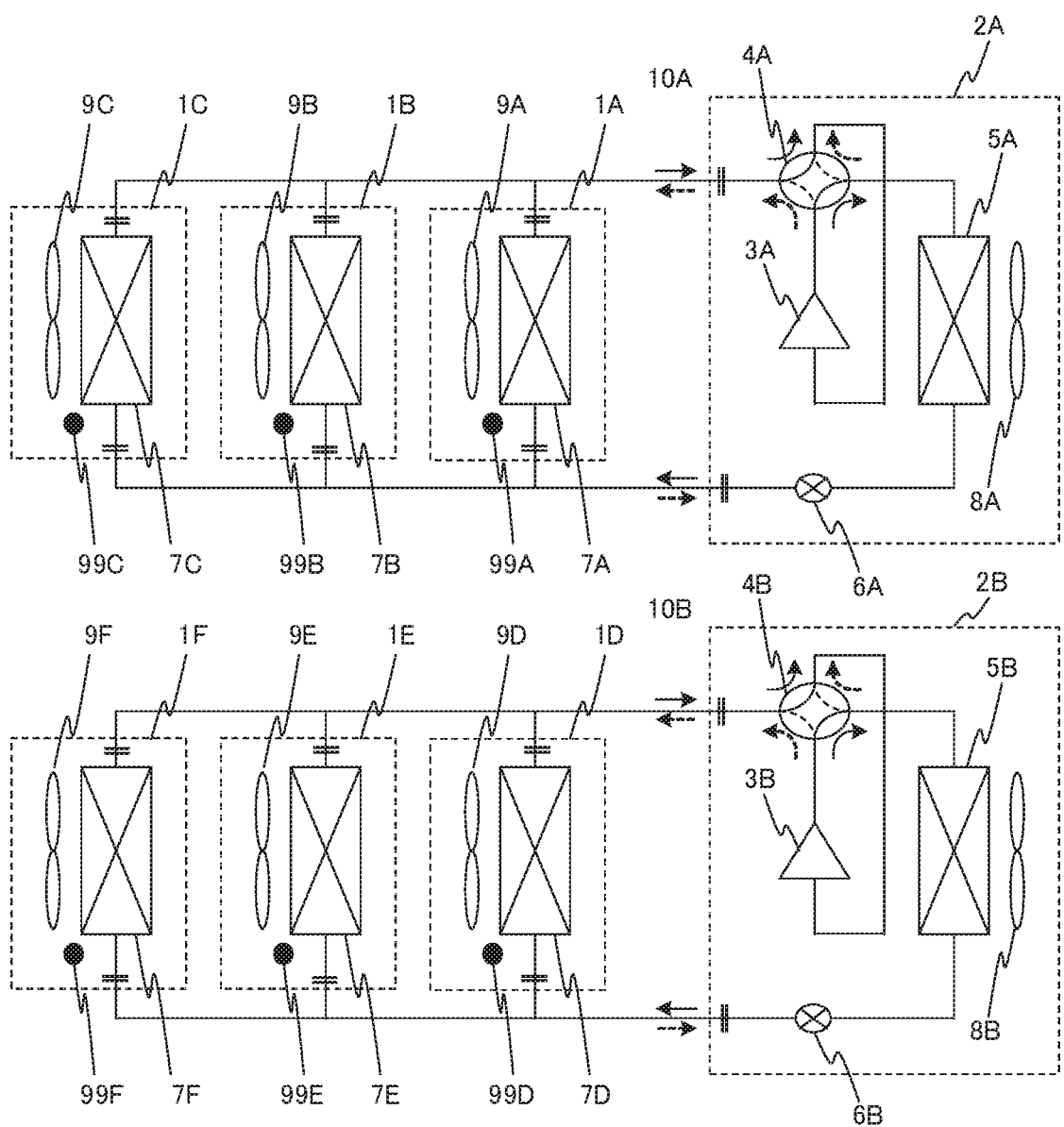
FIG. 10 is a refrigerant circuit diagram illustrating a schematic configuration of an air-conditioning apparatus according to modification 5 of embodiment 1 of the present invention.

FIG. 10 is a refrigerant circuit diagram illustrating a schematic configuration of an air-conditioning apparatus according to modification 5 of embodiment 1. As illustrated in FIG. 10, the air-conditioning apparatus according to modification 5 includes a plurality of refrigeration cycle circuits 10A and 10B. The refrigeration cycle circuits 10A and 10B are filled with the same refrigerant or different refrigerants.

In a configuration of the refrigeration cycle circuit 10A, the compressor 3A, the refrigerant flow switching unit 4A, the heat-source-side heat exchanger 5A, the pressure-reducing unit 6A and the load-side heat exchangers 7A, 7B and 7C are connected annularly by refrigerant pipes. The load-side heat exchangers 7A, 7B and 7C are connected in parallel to each other in the refrigeration cycle circuit 10A. The compressor 3A, the refrigerant flow switching unit 4A, the heat-source-side heat exchanger 5A, the pressure-reducing unit 6A and the outdoor air-sending fan 8A which supplies outdoor air to the heat-source-side heat exchanger 5A are accommodated in the outdoor unit 2A. The load-side heat exchangers 7A, 7B and 7C, the indoor air-sending fans 9A, 9B and 9C which supply air to the load-side heat exchangers 7A, 7B and 7C, and the refrigerant detection units 99A, 99B and 99C which detect leakage of refrigerant are accommodated in the indoor units 1A 1B and 1C, respectively.

In a configuration of the refrigeration cycle circuit 10B, the compressor 3B, the refrigerant flow switching unit 4B, the heat-source-side heat exchanger 5B, the pressure-reducing unit 6B and a plurality of load-side heat exchangers 7D, 7E and 7F are connected annularly by refrigerant pipes. The load-side heat exchangers 7D, 7E and 7F are connected in parallel to one another in the refrigeration cycle circuit 10B. The compressor 3B, the refrigerant flow switching unit 4B, the heat-source-side heat exchanger 5B, the pressure-reducing unit 6B, and the outdoor air-sending fan 8B that supplies outdoor air to the heat-source-side heat exchanger 5B are accommodated in the outdoor unit 2B. The load-side heat exchangers 7D, 7E and 7F, indoor air-sending fans 9D, 9E and 9F which supply air to the load-side heat exchangers 7D, 7E and 7F, and refrigerant detection units 99D, 99E and 99F which detect leakage of refrigerant are accommodated in indoor units 1D, 1E and 1F, respectively.

The indoor units 1A, 1B and 1C are installed in, for example, an indoor space having no partitions. The indoor units 1D, 1E and 1F are installed in an indoor space different from the indoor space in which the indoor units 1A, 1B, and 1C are installed.

Figure 11:
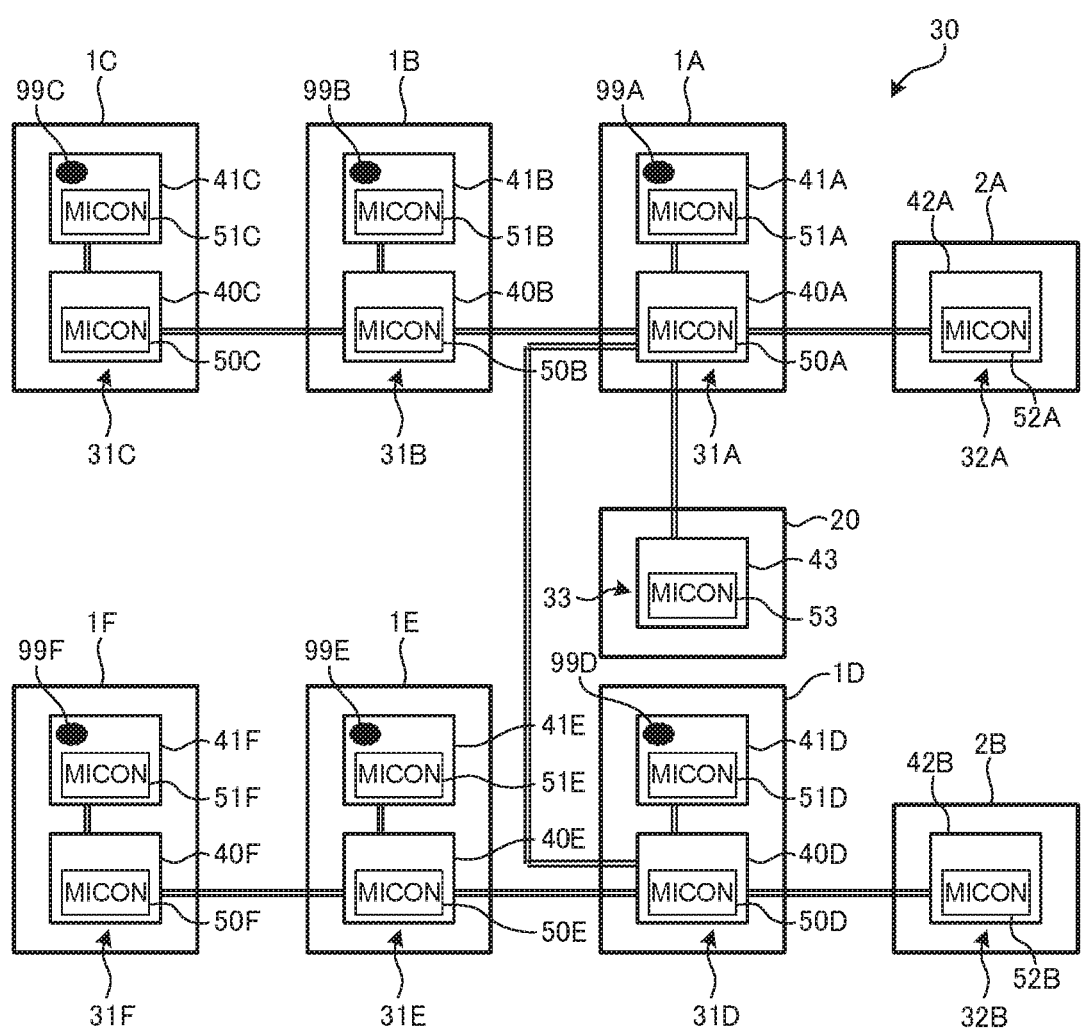
FIG. 11 is a block diagram illustrating a configuration of a controller 30 of the air-conditioning apparatus according to modification 5 of embodiment 1 of the present invention.

FIG. 11 is a block diagram illustrating a configuration of the controller 30 of the air-conditioning apparatus according to modification 5. As illustrated in FIG. 11, in modification 5, the indoor units 1A, 1B and 1C which are connected to the refrigeration cycle circuit 10A and the indoor units 1D, 1E and 1F which are connected to the refrigeration cycle circuit 10B are operated using the single remote control 20. The refrigeration cycle circuit 10A forms a so-called simultaneous-operation multi-type air-conditioning apparatus in which the indoor units 1A, 1B and 1C operate in the same operation mode. Operation patterns of the refrigeration cycle circuit 10A are, for example, a first operation pattern in which all the indoor units 1A, 1B and 1C perform the cooling operation, a second operation pattern in which all the indoor units 1A, 1B and 1C perform the heating operation, and a third operation pattern in which all the indoor units 1A, 1B and 1C are stopped.

Furthermore, the refrigeration cycle circuit 10B configures an air-conditioning apparatus of a simultaneous-operation multiple type in which the indoor units 1D, 1E and 1F operate in the same operation mode. Operation patterns of the refrigeration cycle circuit 10B are, for example, a first operation pattern in which all the indoor units 1D, 1E and 1F perform the cooling operation, a second operation pattern in which all the indoor units 1D, 1E and 1F perform the heating operation, and a third operation pattern in which all the indoor units 1D, 1E and 1F are stopped. However, the refrigeration cycle circuit 10A and the refrigeration cycle circuit 10B can be operated in operation patterns which are independent of each other, by operating the remote control 20. In modification 5, the single remote control 20 is provided. However, a remote control to be operated for operation of the indoor units 1A, 1B and 1C which are connected to the refrigeration cycle circuit 10A and a remote control to be operated for operation of the indoor units 1D, 1E and 1F which are connected to the refrigeration cycle circuit 10B may be provided.

The controller 30 includes the indoor-unit control unit 31A which is mounted in the indoor unit 1A and controls the indoor unit 1A, the indoor-unit control unit 31B which is mounted in the indoor unit 1B and controls the indoor unit 1B, the indoor-unit control unit 31C which is mounted in the indoor unit 1C and controls the indoor unit 1C, an outdoor-unit control unit 32A which is mounted in the outdoor unit 2A and controls the outdoor unit 2A, an indoor-unit control unit 31D which is mounted in the indoor unit 1D and controls the indoor unit 1D, an indoor-unit control unit 31E which is mounted in the indoor unit 1E and controls the indoor unit 1E, an indoor-unit control unit 31F which is mounted in the indoor unit 1F and controls the indoor unit 1F, an outdoor-unit control unit 32B that is mounted in the outdoor unit 2B and controls the outdoor unit 2B, and the remote-control control unit 33 which is mounted in the remote control 20 and controls the remote control 20.

The indoor-unit control unit 31A includes the control board 40A on which the micon 50A is mounted and the control board 41A on which the micon 51A and the refrigerant detection unit 99A are mounted. In a similar manner, the indoor-unit control units 31B, 31C, 31D, 31E and 31F include the control boards 40B, 40C, 40D, 40E and 40F on which the micons 50B, 50C, 50D, 50E and 50F are mounted, and the control boards 41B, 41C, 41D, 41E and 41F on which the micons 51B, 51C, 51D, 51E and 51F and the refrigerant detection units 99B, 99C, 99D, 99E and 99F are mounted, respectively.

The micons 51A, 51B, 51C, 51D, 51E and 51F each include a rewritable nonvolatile memory. The nonvolatile memory includes a leakage history bit (an example of a leakage history memory area), as explained above.

The outdoor-unit control unit 32A includes a control board 42A on which a micon 52A is mounted. The outdoor-unit control unit 32B includes a control board 42B on which a micon 52B is mounted.

The remote-control control unit 33 includes the control board 43 on which the micon 53 is mounted.

The indoor-unit control units 31A, 31B, 31C, 31D, 31E and 31F, the outdoor-unit control units 32A and 32B and the remote-control control unit 33 are connected such that they can communicate with each other via control lines.

When the refrigerant detection unit 99A detects leakage of refrigerant, the leakage history bit of the micon 51A is rewritten from "0" to "1". Similarly, when the refrigerant detection units 99B, 99C, 99D, 99E and 99F detect leakage of refrigerant, the leakage history bits of the micons 51B, 51C, 51D, 51E and 51F are rewritten from "0" to "1". The leakage history bits of all the micons 51A, 51B, 51C, 51D, 51E and 51F are irreversibly rewritable only one way from "0" to "1". Furthermore, the leakage history bits of all the micons 51A, 51B, 51C, 51D, 51E and 51F are maintained regardless of whether or not power is supplied to the micons 51A, 51B, 51C, 51D, 51E and 51F.

In the memories (nonvolatile memories or volatile memories) of the micons 50A, 50B, 50C, 50E, 50D, 50F, 52A, 52B and 53, a first leakage history bit corresponding to the leakage history bit of the micon 51A, a second leakage history bit corresponding to the leakage history bit of the micon 51B, a third leakage history bit corresponding to the leakage history bit of the micon 51C, a fourth leakage history bit corresponding to the leakage history bit of the micon 51D, a fifth leakage history bit corresponding to the leakage history bit of the micon 51E, and a sixth leakage history bit corresponding to the leakage history bit of the micon 51F are provided. The first to sixth leakage history bits of the micons 50A, 50B, 50C, 50E, 50D, 50F, 52A, 52B and 53 can be set to "0" or "1" and are rewritable two ways between "0" and "1", i.e., from "0" to "1" and from "1" to "0". The value of the first leakage history bit of each of the micons 50A, 50B, 50C, 50E, 50D, 50F, 52A, 52B and 53 is set to the same value as the leakage history bit of the micon 51A which is acquired by communication. Similarly, the values of the second to sixth leakage history bits of the micons 50A, 50B, 50C, 50E, 50D, 50F, 52A, 52B and 53 are set to the same values as the leakage history bits of the micons 51B, 51C, 51D, 51E and 51F which are acquired by communication. Even if power supply is interrupted and the values of the first to sixth leakage history bits of the micons 50A, 50B, 50C, 50E, 50D, 50F, 52A, 52B and 53 are returned to the initial value (for example, "0"), when power supply is resumed, the first to sixth leakage history bits of the micons 50A, 50B, 50C, 50E, 50D, 50F, 52A, 52B and 53 are re-set to the same values as the leakage history bits of the micons 51A, 51B, 51C, 51D, 51E and 51F.

Furthermore, the controller 30 sets a group of the indoor units 1A, 1B and 1C which form a simultaneous-operation multi-type air-conditioning apparatus and a group of the indoor units 1D, 1E and 1F which form another simultaneous-operation mode multi-type air-conditioning apparatus, as one or more groups. In the present embodiment, the group of the indoor units 1A, 1B and 1C is installed in an indoor space, and the group of the indoor units 1D, 1E and 1F is installed in another indoor space. Therefore, the group of the indoor units 1A, 1B and 1C is set as, for example, a group A, and the group of the indoor units 1D, 1E and 1F is set as, for example, a group B. If all the indoor units 1A, 1B, 1C, 1D, 1E and 1F are installed in an indoor space, the group of the indoor units 1A, 1B and 1C and the group of the indoor units 1D, 1E and 1F may be set as a single group.

When the first to third leakage history bits of the micon 50A (that is, leakage history bits associated with the indoor units 1A, 1B and 1C which belong to the group A) are all set to "0", the indoor-unit control unit 31A performs normal control over the indoor unit 1A regardless of the values of the fourth to sixth leakage history bits (that is, leakage history bits associated with the indoor units 1D, 1E and 1F that belong to a group different from the group A). When the indoor unit 1A is in this state, it performs a normal drive operation and a stop operation based on an operation of the remote control 20 or another device. In contrast, when any of the first to third leakage history bits of the micon 50A is set to "1", the indoor-unit control unit 31A controls the indoor air-sending fan 9A to be forcibly operated, regardless of the values of the fourth to sixth leakage history bits. To be more specific, when the indoor unit 1A is operating, the operation of the indoor air-sending fan 9A is continued, and when the indoor unit 1A is in a stopped state, the operation of the indoor air-sending fan 9A is started. The operation of the indoor air-sending fan 9A is continued as long as, for example, any of the first to third leakage history bits of the micon 50A is set to "1".

The indoor-unit control units 31B and 31C perform control similar to that of the indoor-unit control unit 31A, based on the values of the first to third leakage history bits.

When the fourth to sixth leakage history bits of the micon 50D (that is, leakage history bits associated with the indoor units 1D, 1E and 1F that belong to the group B) are all set to "0", the indoor-unit control unit 31D performs normal control over the indoor unit 1D regardless of the values of the first to third leakage history bits (that is, leakage history bits associated with the indoor units 1A, 1B and 1C that belong to a group different from the group B). When the indoor unit 1D is in this state, it performs a normal driving operation and a stop operation based on an operation of the remote control 20 or another device. In contrast, when any of the fourth to sixth leakage history bits of the micon 50D is set to "1", the indoor-unit control unit 31D controls the indoor air-sending fan 9D to be forcibly operated, regardless of values of the first to third leakage history bits. To be more specific, when the indoor unit 1D is operating, the operation of the indoor air-sending fan 9D is continued, and when the indoor unit 1D is in a stopped state, the operation of the indoor air-sending fan 9D is started. The operation of the indoor air-sending fan 9D is continued as long as, for example, any of the fourth to sixth leakage history bits of the micon 50D is set to "1".

The indoor-unit control units 31E and 31F perform control similar to that of the indoor-unit control unit 31D, based on the values of the fourth to sixth leakage history bits.

When the first to third leakage history bits of the micon 52A are all set to "0", the outdoor-unit control unit 32A performs normal control over the outdoor unit 2A regardless of the values of the fourth to sixth leakage history bits. In contrast, when any of the first to third leakage history bits of the micon 52A is set to "1", for example, the outdoor-unit control unit 32A performs control to stop the compressor 3A or control to inhibit the operation of the compressor 3A, regardless of the values of the fourth to sixth leakage history bits. Such control is continued as long as any of the first to third leakage history bits of the micon 52A is set to "1".

When the fourth to sixth leakage history bits of the micon 52B are all set to "0", the outdoor-unit control unit 32B performs normal control over the outdoor unit 2B regardless of the values of the first to third leakage history bits. In contrast, when any of the fourth to sixth leakage history bits of the micon 52B is set to "1", for example, the outdoor-unit control unit 32B perform control to stop the compressor 3B or control to inhibit the operation of the compressor 3B, regardless of the values of the first to third leakage history bits. Such control is continued as long as any of the fourth to sixth leakage history bits of the micon 52B is set to "1".

When the first to sixth leakage history bits of the micon 53 are all set to "0", the remote-control control unit 33 performs normal control over the remote control 20. In contrast, when any of the first to sixth leakage history bits of the micon 53 is set to "1", for example, the remote-control control unit 33 causes the display unit provided at the remote control 20 to display information including the type of abnormality, a treatment method or a position where leakage of refrigerant has occurred. Such display is continued as long as any of the first to sixth leakage history bits of the micon 53 is set to "1". Furthermore, the remote-control control unit 33 may cause a voice output unit provided at the remote control 20 to indicate in voice, information including the type of abnormality, the treatment method or the position where leakage of refrigerant has occurred. It may be set that even when any of the first to third leakage history bits of the micon 53 is set to "1", if the fourth to sixth leakage history bits are all set to "0", the remote-control control unit 33 can be operated as usual by the user for operation of the indoor units 1D, 1E and 1F. Also, it may be set that even when any of the fourth to sixth leakage history bits of the micon 53 is set to "1", if the first to third leakage history bits are all set to "0", the remote-control control unit 33 can be operated as usual by the user for operation of the indoor units 1A, 1B and 1C.

In the above configuration, if leakage of refrigerant occurs, for example, in the indoor unit 1A, the refrigerant detection unit 99A of the indoor unit 1A detects the leakage of refrigerant. When the leakage of refrigerant is detected by the refrigerant detection unit 99A, the micon 51A irreversibly rewrites the leakage history bit from the initial value "0" to "1". When the leakage history bit of the micon 51A is set to "1", the first leakage history bit of each of the micons 50A, 50B, 50C, 50D, 50E, 50F, 52A, 52B and 53 is also rewritten from "0" to "1". As a result, forced operation of the indoor air-sending fans 9A, 9B and 9C, stopping of the compressor 3A, inhibition of operation of the compressor 3A, display of information on the display unit of the remote control 20, etc., are performed. Since the indoor units 1D, 1E and 1F are assigned to a group different from that of the indoor unit 1A, forced operation of the indoor air-sending fans 9D, 9E and 9F, stopping of the compressor 3B, inhibition of operation of the compressor 3B, etc., are not performed.

In repairing of a portion where leakage of refrigerant has occurred, a service person who is contacted by the user replaces the control board 41A at which leakage of refrigerant has been detected, with a new one. This is because if only repairing of the portion where leakage of refrigerant has occurred is carried out, the leakage history bit of the micon 51A is kept at "1", and thus the refrigeration cycle circuit 10A of the air-conditioning apparatus cannot perform a normal operation. Since the refrigerant detection unit 99A is non-detachably connected to the control board 41A, in order to replace the control board 41A, the refrigerant detection unit 99A is also replaced with a new one.

The leakage history bit of the micon 51A mounted on the new control board 41A is set to the initial value "0". Therefore, the first leakage history bit of each of the micons 50A, 50B, 50C, 50D, 50E, 50F, 52A, 52B and 53 is rewritten from "1" to "0". As a result, the entire air-conditioning apparatus including the refrigeration cycle circuits 10A and 10B can perform a normal operation.

In modification 5, when leakage of refrigerant occurs in any of the indoor units 1A, 1B, 1C, 1D, 1E and 1F, an indoor air-sending fan of an indoor unit which belongs to a group different from that of the indoor unit in which the leakage of refrigerant has occurred can be inhibited from operating. Therefore, according to modification 5, it is possible to prevent execution of a forced operation of an indoor air-sending fan which does not contribute to diffusion of refrigerant that has leaked, and thus prevent unnecessary consumption of power.

Furthermore, in modification 5, when leakage of refrigerant occurs in any of the plurality of indoor units 1A, 1B, 1C, 1D, 1E and 1F, not only the indoor air-sending fan of the indoor unit in which the leakage of refrigerant has occurred, but the indoor air-sending fans of all the indoor units that belong to the same group as the indoor unit in which the leakage of refrigerant has occurred, can be operated. Therefore, even in the case where the floor area of an indoor space is great, refrigerant which has leaked can be sufficiently diffused into the indoor space. Thus, even if leakage of refrigerant occurs, it is possible to prevent the density of refrigerant in the indoor space from being locally increased. Accordingly, it is possible to prevent the density of refrigerant in the indoor space from being increased to an allowable value or more. In addition, even in the case where a flammable refrigerant is used, it is possible to prevent a flammable density region from being formed in the indoor space.

Furthermore, in Embodiment 5, when leakage of refrigerant occurs in any of the indoor units 1A, 1B, 1C, 1D, 1E and 1F, the indoor air-sending fans of all the indoor units which belong to the same group as the indoor unit in which the leakage of refrigerant has occurred are started to operate. Thus, a sudden driving start operation, which is different from the normal operation, is performed in one or more indoor units that are installed in an indoor space. Therefore, a larger number of people can be informed of occurrence of abnormality which is leakage of refrigerant. Accordingly, it is possible to more reliably handle it, for example, open a window.

(Modification 6)

Figure 12:
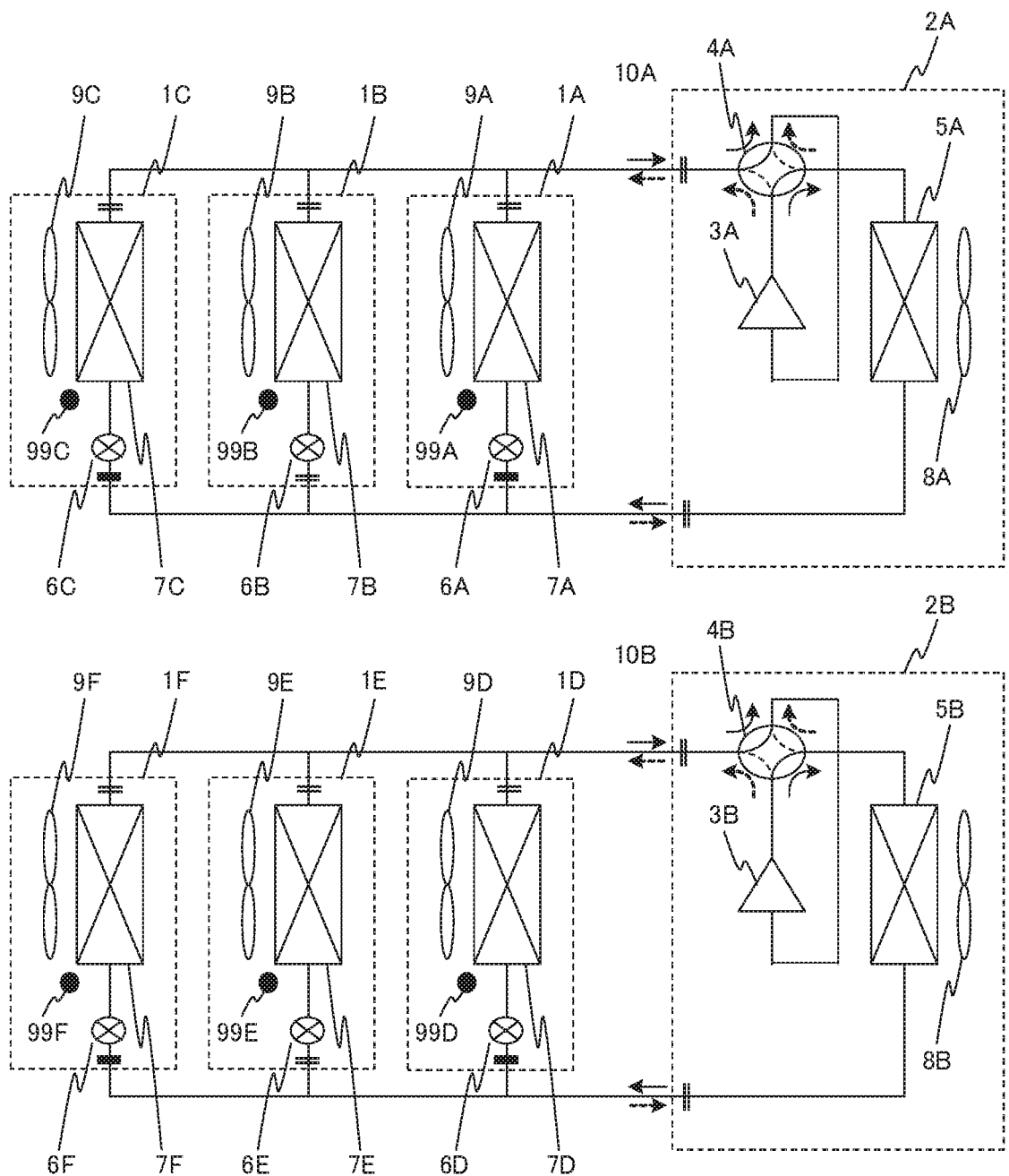
FIG. 12 is a refrigerant circuit diagram illustrating a schematic configuration of an air-conditioning apparatus according to modification 6 of embodiment 1 of the present invention.

FIG. 12 is a refrigerant circuit diagram illustrating a schematic configuration of an air-conditioning apparatus according to modification 6 of embodiment 1. As illustrated in FIG. 12, the air-conditioning apparatus according to modification 6 includes pressure-reducing units 6A, 6B, 6C, 6D, 6E and 6F associated with the indoor units 1A, 1B, 1C, 1D, 1E and 1F, respectively. The pressure-reducing units 6A, 6B, 6C, 6D, 6E and 6F are accommodated in the indoor units 1A, 1B, 1C, 1D, 1E and 1F, respectively. The indoor units 1A, 1B and 1C are installed in, for example, an indoor space with no partitions. The indoor units 1D, 1E and 1F are installed in an indoor space that is different from the indoor space in which the indoor units 1A, 1B and 1C are installed. The indoor units 1A, 1B and 1C are assigned to a group A, and the indoor units 1D, 1E and 1F are assigned to a group B.

Figure 13:
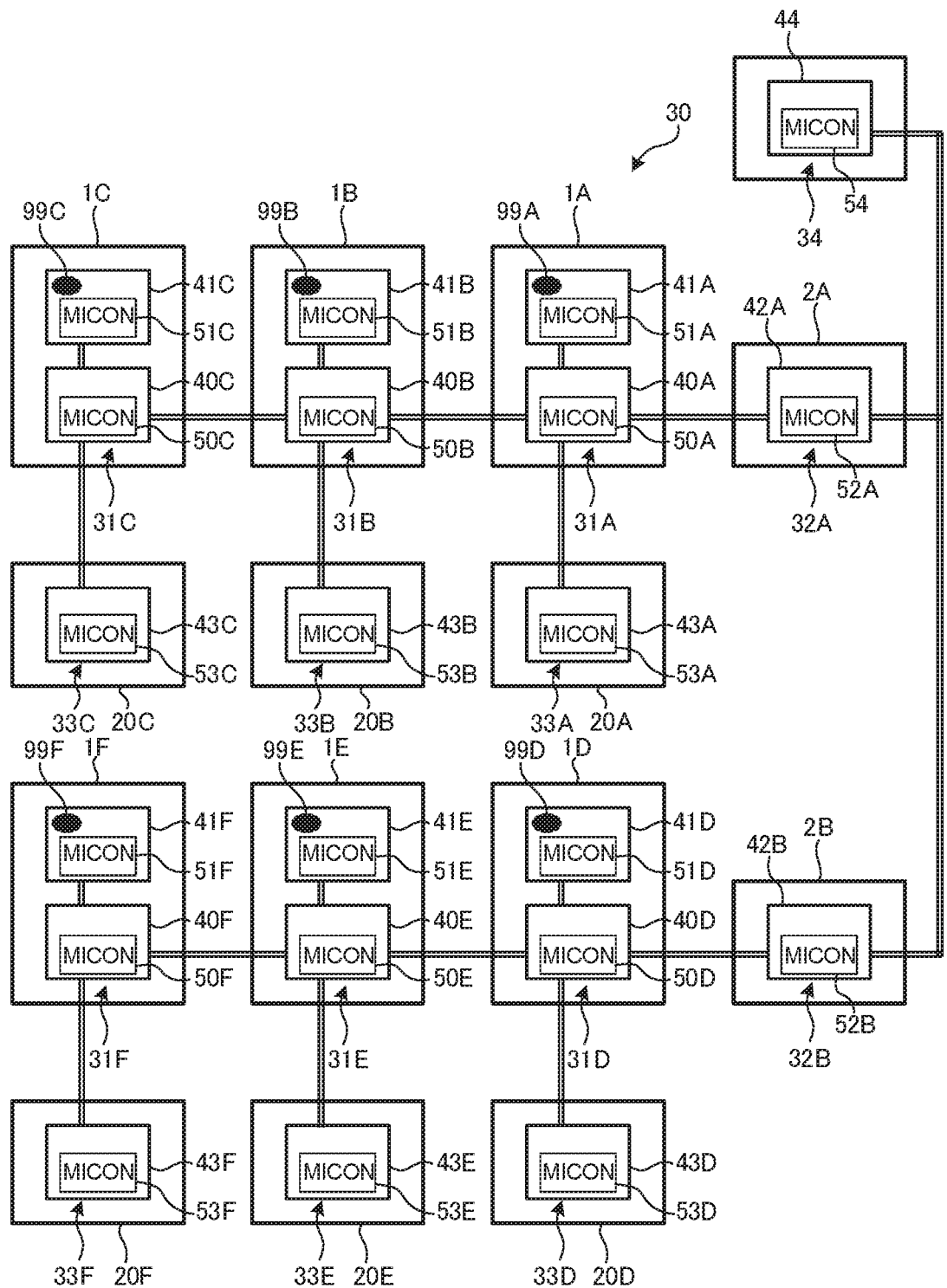
FIG. 13 is a block diagram illustrating a configuration of a controller 30 of the air-conditioning apparatus according to modification 6 of embodiment 1 of the present invention.

FIG. 13 is a block diagram illustrating a configuration of the controller 30 of the air-conditioning apparatus according to modification 6. As illustrated in FIG. 13, in modification 6, the indoor units 1A, 1B and 1C which are connected to the refrigeration cycle circuit 10A and the indoor units 1D, 1E and 1F which are connected to the refrigeration cycle circuit 10B are operated using the remote controls 20A, 20B, 20C, 20D, 20E and 20F, respectively.

The controller 30 includes the remote-control control unit 33A which is mounted in the remote control 20A and controls the remote control 20A, the remote-control control unit 33B which is mounted in the remote control 20B and controls the remote control 20B, the remote-control control unit 33C which is mounted in the remote control 20C and controls the remote control 20C, a remote-control control unit 33D which is mounted in a remote control 20D and controls the remote control 20D, a remote-control control unit 33E which is mounted in a remote control 20E and controls the remote control 20E, and a remote-control control unit 33F which is mounted in a remote control 20F and controls the remote control 20F, in addition to the indoor-unit control units 31A, 31B, 31C, 31D, 31E and 31F and the outdoor-unit control units 32A and 32B.

The remote-control control unit 33A includes the control board 43A on which the micon 53A is mounted. Similarly, the remote-control control units 33B, 33C, 33D, 33E and 33F include control boards 43B, 43C, 43D, 43E and 43F on which micons 53B, 53C, 53D, 53E and 53F are mounted, respectively.

Furthermore, the indoor-unit control units 31A, 31B, 31C, 31D, 31E and 31F, the outdoor-unit control units 32A and 32B and the remote-control control units 33A, 33B, 33C, 33D, 33E and 33F are connected to a host control unit 34. The host control unit 34 includes a control board 44 on which a micon 54 is mounted. The host control unit 34 functions as a centralized controller which manages the indoor units 1A, 1B, 1C, 1D, 1E and 1F in a centralized manner. That is, the indoor units 1A, 1B and 1C and the outdoor unit 2A, and the indoor units 1D, 1E and 1F and the outdoor unit 2B, form an individual-operation multi-type air-conditioning apparatus.

Memories of the micons 53A, 53B, 53C, 53D, 53E, 53F and 54, as well as those of the micons 50A, 50B, 50C, 50E, 50D, 50F, 52A and 52B, each include a first leakage history bit corresponding to the leakage history bit of the micon 51A, a second leakage history bit corresponding to the leakage history bit of the micon 51B, a third leakage history bit corresponding to the leakage history bit of the micon 51C, a fourth leakage history bit corresponding to the leakage history bit of the micon 51D, a fifth leakage history bit corresponding to the leakage history bit of the micon 51E, and a sixth leakage history bit corresponding to the leakage history bit of the micon 51F.

Also in modification 6, when leakage of refrigerant occurs in any of the plurality of indoor units 1A, 1B, 1C, 1D, 1E and 1F, an indoor air-sending fan of an indoor unit which belongs to a group different from that of the indoor unit in which the leakage of refrigerant has occurred can be inhibited from operating. Therefore, according to modification 6, it is possible to prevent execution of a forced operation of an indoor air-sending fan that does not contribute to diffusion of refrigerant that has leaked, and thus prevent unnecessary consumption of power.

Furthermore, also in modification 6, when leakage of refrigerant occurs in any of the plurality of indoor units 1A, 1B, 1C, 1D, 1E and 1F, not only the indoor air-sending fan of the indoor unit in which the leakage of refrigerant has occurred, but the indoor air-sending fans of all the indoor units that belong to the same group as the indoor unit in which the leakage of refrigerant has occurred, can be operated. Therefore, even in the case where the floor area of an indoor space is great, refrigerant that has leaked can be sufficiently diffused into the indoor space. Therefore, even if leakage of refrigerant occurs, it is possible to prevent the density of refrigerant in the indoor space from being locally increased can. Thus, it is possible to prevent the density of refrigerant in the indoor space from being increased to an allowable value or more. In addition, even in the case where a flammable refrigerant is used, it is possible to prevent a flammable density region from being formed in the indoor space.

Furthermore, also in Embodiment 6, when leakage of refrigerant occurs in any of the indoor units 1A, 1B, 1C, 1D, 1E and 1F, the indoor air-sending fans of all the indoor units that belong to the same group as the indoor unit in which the leakage of refrigerant has occurred are started to operate. Therefore, a sudden driving start operation, which is different from the normal operation, is performed in one or more indoor units that are installed in an indoor space. Thus, a larger number of people can be informed of occurrence of abnormality which is leakage of refrigerant. Accordingly, it is possible to more reliably handle it, for example, open a window.

(Modification 7)

Figure 14:
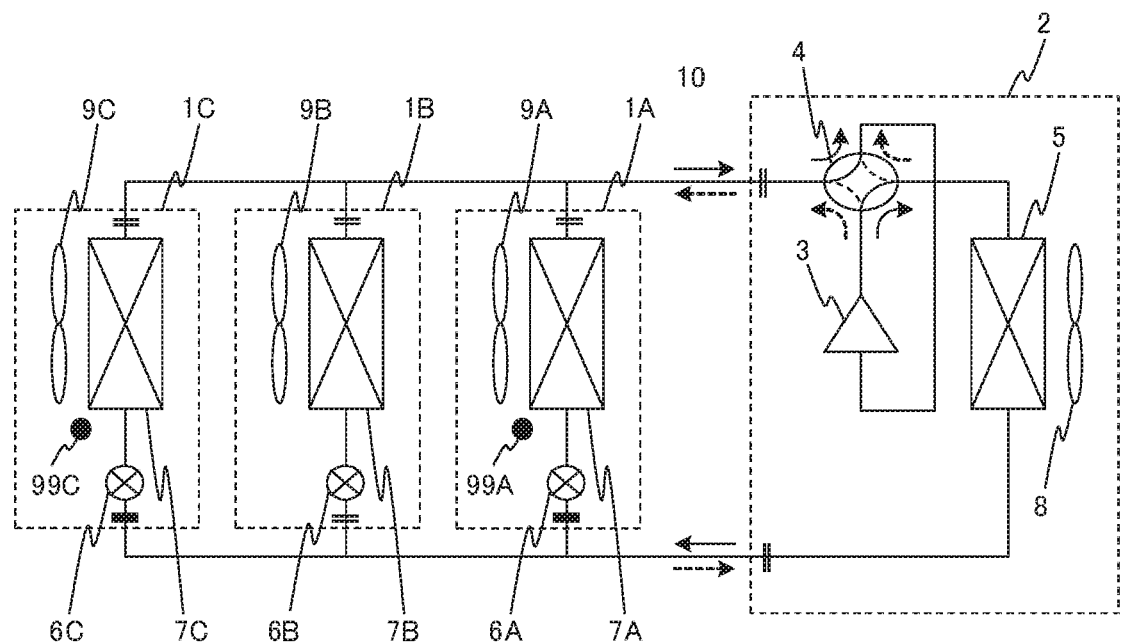
FIG. 14 is a refrigerant circuit diagram illustrating a schematic configuration of an air-conditioning apparatus according to modification 7 of embodiment 1 of the present invention.
Figure 15:
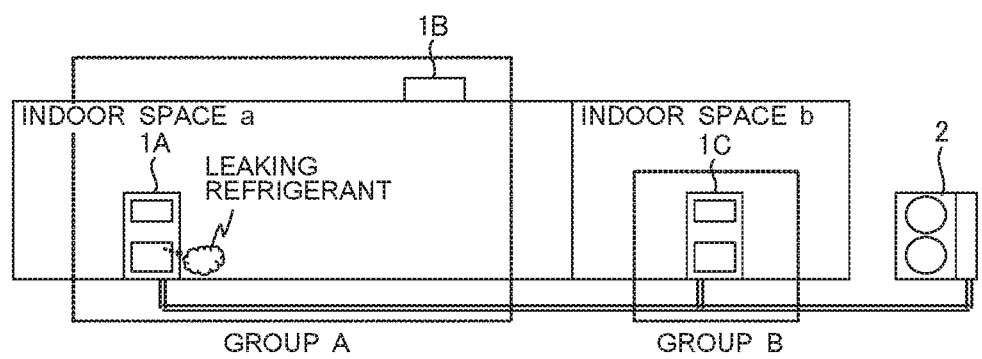
FIG. 15 is a diagram illustrating installation of indoor units 1A, 1B and 1C in the air-conditioning apparatus according to modification 7 of embodiment 1 of the present invention.

FIG. 14 is a refrigerant circuit diagram illustrating a schematic configuration of an air-conditioning apparatus according to modification 7 of embodiment 1. FIG. 15 is a diagram illustrating an example of installation of the indoor units 1A, 1B and 1C in the air-conditioning apparatus according to modification 7. As illustrated in FIGS. 14 and 15, the air-conditioning apparatus according to modification 7 includes a floor-mounted type of indoor units 1A and 1C and a ceiling cassette type of indoor unit 1B. The indoor units 1A and 1B are installed in an indoor space a, and the indoor unit 1C is installed in an indoor space b. The indoor units 1A and 1B are assigned to a group A, and the indoor unit 1C is assigned to a group B. In the indoor units 1A and 1C which are of the floor-mounted type, the refrigerant detection units 99A and 99C are provided, respectively. In the indoor unit 1B which is of the ceiling cassette type, no refrigerant detection unit is provided.

In the above configuration, when leakage of refrigerant occurs in the floor-mounted type of indoor unit 1A, as illustrated in FIG. 15, the refrigerant detection unit 99A of the indoor unit 1A detects the leakage of refrigerant. The controller of the indoor unit 1A shares information indicating that the leakage of refrigerant has occurred in the indoor unit 1A, with the controllers of the indoor units 1B, 1C, etc. The controllers of the indoor units 1A, 1B and 1C determine, based on the information indicating that leakage of refrigerant has occurred in the indoor unit 1A and information on grouping, whether to forcibly operate the indoor air-sending fans 9A, 9B and 9C or not. The controller of the indoor unit 1A controls the indoor air-sending fan 9A to be forcibly operated, since the leakage of refrigerant has occurred in the indoor unit 1A. Also, the controller of the indoor unit 1B controls the indoor air-sending fan 9B to be forcibly operated, since the indoor unit 1A in which the leakage of refrigerant has occurred belongs to the same group as the indoor unit 1B. In contrast, the controller of the indoor unit 1C performs normal control without causing the indoor air-sending fan 9C to be forcibly operated, since the indoor unit 1A in which the leakage of refrigerant has occurred belongs to a group different from that of the indoor unit 1C. That is, when leakage of refrigerant occurs in the indoor unit 1A, the indoor air-sending fans 9A and 9B in the indoor units 1A and 1B which belong to the group A are forcibly operated, and the indoor air-sending fan 9C in the indoor unit 1C which belongs to a group different from the group A is not forcibly operated. It is therefore possible to prevent execution of a forced operation of an indoor air-sending fan which does not contribute to diffusion of refrigerant which has leaked, and also prevent unnecessary consumption of power.

Similarly, when leakage of refrigerant occurs in the indoor unit 1C, the indoor air-sending fan 9C of the indoor unit 1C which belongs to the group B is forcibly operated, and the indoor air-sending fans 9A and 9B in the indoor units 1A and 1B which belong to a group different from the group B are not forcibly operated.

In contrast, when leakage of refrigerant occurs in the ceiling cassette type of indoor unit 1B, the leakage of refrigerant is not detected at the indoor unit 1B. Therefore, the indoor air-sending fans 9A and 9B in the indoor units 1A and 1B, that is, the indoor air-sending fan 9B in the indoor unit 1B and the indoor air-sending fan 9A in the indoor unit 1A which belongs to the same group as the indoor unit 1B, i.e., the group A, are not necessarily operated. However, because the ceiling cassette type of the indoor unit 1B is installed at a relatively high position with respect to the floor, even if leakage of refrigerant occurs in the indoor unit 1B, refrigerant which has leaked is diffused before dropping to the floor. It is therefore possible to prevent the density of refrigerant from being locally increased, without the need to operate the indoor air-sending fans 9A and 9B. Accordingly, it is possible to prevent the density of refrigerant in the indoor space from being increased to an allowable value or more. In addition, even in the case where a flammable refrigerant is used, it is possible to prevent a flammable density region from being formed in the indoor space.

That is, as in modification 7, in the case where a floor-mounted type of indoor unit is present in the same space as a ceiling cassette type of indoor unit, a ceiling concealed type of indoor unit or a ceiling suspended type of indoor unit or the like, which is installed at a relatively high position with respect to the floor, no refrigerant detection unit may be provided in the indoor unit of the ceiling cassette type, the ceiling concealed type or the ceiling suspended type of indoor unit. Thereby, it is possible to prevent the density of refrigerant in an indoor space from being locally increased, and besides, reduce the cost of the cost of the air-conditioning apparatus.

As described above, an air-conditioning apparatus (an example of a refrigeration cycle apparatus) according to embodiment 1 (including modifications 1 to 7) includes the refrigeration cycle circuit 10 which includes the load-side heat exchangers 7A, 7B, 7C, 7D, 7E and 7F, the indoor units 1A, 1B, 1C, 1D, 1E and 1F which accommodate the load-side heat exchangers 7A, 7B, 7C, 7D, 7E and 7F, respectively, and the controller 30 which controls the indoor units 1A, 1B, 1C, 1D, 1E and 1F. The indoor units 1A, 1B, 1C, 1D, 1E and 1F include the indoor air-sending fans 9A, 9B, 9C, 9D, 9E and 9F, respectively. At least one (for example, all) of the indoor units 1A, 1B, 1C, 1D, 1E and 1F includes the refrigerant detection units 99A, 99B, 99C, 99D, 99E and 99F, respectively, which detect leakage of refrigerant. The controller 30 divides the indoor units 1A, 1B, 1C, 1D, 1E and 1F into one or more groups. The controller 30 is also set that when leakage of refrigerant is detected by the refrigerant detection unit included in any of the plurality of indoor units 1A, 1B, 1C, 1D, 1E and 1F, the controller 30 causes indoor air-sending fans included in all the indoor units which belongs to the same group as the indoor unit including the refrigerant detection unit which detects the leakage of refrigerant to operate.

Furthermore, the air-conditioning apparatus according to embodiment 1 includes the refrigeration cycle circuits 10A and 10B each including at least one load-side heat exchanger, the indoor units 1A, 1B, 1C, 1D, 1E and 1F which respectively accommodate the load-side heat exchangers 7A, 7B, 7C, 7D, 7E and 7F of the refrigeration cycle circuits 10A and 10B, and the controller 30 which controls the indoor units 1A, 1B, 1C, 1D, 1E and 1F. The indoor units 1A, 1B, 1C, 1D, 1E and 1F include the indoor air-sending fans 9A, 9B, 9C, 9D, 9E and 9F, respectively. At least one (for example, all) of the plurality of indoor units 1A, 1B, 1C, 1D, 1E and 1F include the refrigerant detection units 99A, 99B, 99C, 99D, 99E an 99F which detect leakage of refrigerant. The controller 30 divides the indoor units 1A, 1B, 1C, 1D, 1E and 1F into one or more groups. The controller 30 is set such that when leakage of refrigerant is detected by the refrigerant detection unit included in any one of the plurality of indoor units 1A, 1B, 1C, 1D, 1E and 1F, the controller 30 causes indoor air-sending fans included in all the indoor units which belong to the same group as the indoor unit including the refrigerant detection unit which detects the leakage of refrigerant to operate.

In the above configurations, when leakage of refrigerant occurs in any of the plurality of indoor units 1A, 1B, 1C, 1D, 1E and 1F, an indoor air-sending fan of an indoor unit which belongs to a group different from that of the indoor unit in which the leakage of refrigerant has occurred can be inhibiting from operating. It is therefore possible to prevent execution of a forced operation of an indoor air-sending fan which does not contribute to diffusion of refrigerant which has leaked, and also prevent unnecessary consumption of power.

Furthermore, with the above configurations, when leakage of refrigerant occurs in any of the plurality of indoor units 1A, 1B, 1C, 1D, 1E and 1F, not only the indoor air-sending fan of the indoor unit in which the leakage of refrigerant has occurred but the indoor air-sending fans in all the indoor units which belong to the same group as the indoor unit in which the leakage of refrigerant has occurred can be operated. Thereby, even in the case where the floor area of an indoor space is great, refrigerant which has leaked can be sufficiently diffused into the indoor space. Therefore, even if leakage of refrigerant occurs, it is possible to prevent the density of refrigerant in the indoor space from being locally increased.

Furthermore, the air-conditioning apparatus according to embodiment 1 may be provided to further include an operation unit (for example, the remote controls 20, 20A, 20B, 20C, 20D, 20E and 20F or DIP switches) which performs an operation for dividing the indoor units 1A, 1B, 1C, 1D, 1E and 1F into one or more groups. In this configuration, the above grouping of the indoor units 1A, 1B, 1C, 1D, 1E and 1F may be performed easily and properly by the user or the like.

Furthermore, the air-conditioning apparatus according to embodiment 1 may be set such that the controller 30 includes the indoor-unit control units 31A, 31B, 31C, 31D, 31E and 31F which control the indoor units 1A, 1B, 1C, 1D, 1E and 1F, respectively, at least one (for example, all) of the indoor-unit control units 31A, 31B, 31C, 31D, 31E and 31F includes the control boards 41A, 41B, 41C, 41D, 41E and 41F to which the refrigerant detection units 99A, 99B, 99C, 99D, 99E and 99F are non-detachably connected, and nonvolatile memories included in the control boards 41A, 41B, 41C, 41D, 41E and 41F, respectively; the nonvolatile memories each include a leakage history memory area which stores one of first information (for example, the leakage history bit "0") indicating that no refrigerant leakage history is present and second information (for example, the leakage history bit "1") indicating that a refrigerant leakage history is present; the information stored in the leakage history memory area can be changed only one way from the first information to the second information; and the controller 30 changes, when leakage of refrigerant is detected by a refrigerant detection unit included in any of the indoor-unit control units 31A, 31B, 31C, 31D, 31E and 31F, the information stored in the leakage history memory area of the indoor-unit control unit which detects the leakage of refrigerant, from the first information to the second information.

Furthermore, the air-conditioning apparatus according to embodiment 1 may be set such that the controller 30 causes, when information stored in the leakage history memory area of at least one of the plurality of indoor-unit control units 31A, 31B, 31C, 31D, 31E and 31F is changed from the first information to the second information, indoor air-sending fans included in all the indoor units which belong to the same group as the indoor unit associated with the leakage history memory area to be operated.

Other Embodiments

The present invention is not limited to the foregoing embodiment, and can be variously modified.

For example, in the foregoing embodiment, leakage history bits are illustrated as examples of leakage history memory areas provided in the nonvolatile memories of the micons 51A, 51B, 51C, 51D, 51E and 51F. However, the present invention is not limited to this. For example, a 2-bit leakage history memory area or a greater leakage history memory area may be provided in a nonvolatile memory. The leakage history memory area stores a selected one of first information indicating that no refrigerant leakage history is present and second information indicating that a refrigerant leakage history is present. Furthermore, the information stored in the leakage history memory area can be changed only one way from the first information to the second information. Information stored in the leakage history memory areas of the micons 51A, 51B, 51C, 51D, 51E and 51F is changed from the first information to the second information when leakage of refrigerant is detected by the refrigerant detection units 99A, 99B, 99C, 99D, 99E and 99F, respectively. Furthermore, the first to sixth leakage history memory areas corresponding to the leakage history memory areas of the micons 51A, 51B, 51C, 51D, 51E and 51F are provided in the memories of the micons 50A, 50B, 50C, 50D, 50E, 50F, 52, 52A, 52B, 53, 53A, 53B, 53C, 53D, 53E, 53F and 54, etc.

Furthermore, with respect to the foregoing embodiment, the air-conditioning apparatus is described above by way of example as a refrigeration cycle apparatus. However, the present invention is also applicable to other kinds of refrigeration cycle apparatuses such as a heat pump water heater (for example, a heat pump apparatus described in Japanese Unexamined Patent Application Publication No. 2016-3783), a chiller, a showcase and the like.

Further, with respect to the foregoing embodiment, the refrigeration cycle circuits 10, 10A and 10B to which three or six indoor units are connected are described above by way of example. However, any number of indoor units may be connected to the refrigeration cycle circuits 10, 10A and 10B. Furthermore, with respect to the foregoing embodiment, the refrigeration cycle circuits 10, 10A and 10B to which one or two outdoor units are connected are described above by way of example. However, any number of outdoor units may be connected to the refrigeration cycle circuits 10, 10A and 10B. In addition, with respect to the foregoing embodiment, an air-conditioning apparatus including the refrigeration cycle circuit 10 or the two refrigeration cycle circuits 10A and 10B is described above by way of example. However, any number of refrigeration cycle circuits may be provided. Furthermore, with respect to the foregoing embodiment, it is described above by way of example that the refrigerant detection unit is provided in the housing of the indoor unit. However, the refrigerant detection unit may be provided outside the housing of the indoor unit as long as the refrigerant detection unit is connected to the controller of the refrigeration cycle apparatus. For example, the refrigerant detection unit may be provided in the indoor space or may be provided near the floor in the indoor space, in consideration of the fact that refrigerant has a higher density than air. Furthermore, for example, in the case where two floor-mounted type indoor units are provided, as long as the refrigerant detection unit is provided near the floor located between the two floor-mounted type indoor units, it can detect leakage of refrigerant in both the floor-mounted type indoor units. Furthermore, as described regarding modification 7, in the case where a floor-mounted type of indoor unit is provided in the same space as a ceiling cassette type of indoor unit, a ceiling concealed type of indoor unit, a ceiling suspended type of indoor unit or the like, it may be set that the ceiling cassette type, ceiling concealed type or ceiling suspended type of indoor unit or the like does not include a refrigerant detection unit. Therefore, not all the indoor units always need include a refrigerant detection unit.

Moreover, with respect to the foregoing embodiment, it is described above by way of example that the indoor air-sending fan is provided in the housing of the indoor unit. However, the indoor air-sending fan may be provided outside the housing of the indoor unit as long as the indoor air-sending fan is connected to the controller of the refrigeration cycle apparatus.

Furthermore, with respect to the foregoing embodiment, it is described above by way of example that when the refrigerant detection unit included in any of the indoor units detects leakage of refrigerant, indoor air-sending fans included in all the indoor units that belong to the same group as the indoor unit that includes the refrigerant detection unit which detects the leakage of refrigerant are operated. However, this configuration may also be applied to the outdoor units. In such a case, in the refrigeration cycle apparatus, each of the outdoor units includes an air-sending fan, and at least one (for example, all) of the outdoor units includes a refrigerant detection unit. The controller divides the outdoor units into one or more groups. Also, the controller is set such that when leakage of refrigerant is detected by the refrigerant detection unit included in any of the outdoor units, the controller causes air-sending fans included in all the outdoor units which belong to the same group as the outdoor unit which includes the refrigerant detection unit which detects the leakage of refrigerant to be operated.

Furthermore, the foregoing embodiments and modifications can be implemented by combining some or all of them.

REFERENCE SIGNS LIST 1A, 1B, 1C, 1D, 1E, 1F: indoor unit, 2, 2A, 2B: outdoor unit, 3, 3A, 3B: compressor, 4, 4A, 4B: refrigerant flow switching unit, 5, 5A, 5B: heat-source-side heat exchanger, 6A, 6B, 6C, 6D, 6E, 6F: pressure-reducing unit, 7A, 7B, 7C, 7D, 7E, 7F: load-side heat exchanger, 8, 8A, 8B: outdoor air-sending fan, 9A, 9B, 9C, 9D, 9E, 9F: indoor air-sending fan, 10, 10A, 10B: refrigeration cycle circuit, 11: branching unit, 20, 20A, 20B. 20C, 20D, 20E, 20F: remote control, 30: controller, 31A, 31B, 31C, 31D, 31E, 31F: indoor-unit control unit, 32, 32A, 32B: outdoor-unit control unit, 33, 33A, 33B, 33C, 33D, 33E, 33F: remote-control control unit, 34: host control unit, 40A, 40B, 40C, 40D, 40E, 40F, 41A, 41B, 41C, 41D, 41E, 41F, 42, 42A, 42B, 43, 43A, 43B, 43C, 43D, 43E, 43F, 44: control board, 50A, 50B, 50C, 50D, 50E, 50F, 51A, 51B, 51C, 51D, 51E, 51F, 52, 52A, 52B, 53, 53A, 53B, 53C, 53D, 53E, 53F, 54: micon, 99A, 99B, 99C, 99D, 99E, 99F: refrigerant detection unit.

The invention claimed is:

1. A refrigeration cycle apparatus comprising:
a refrigeration cycle circuit which includes a plurality of load-side heat exchangers;
a plurality of indoor units which accommodate the plurality of load-side heat exchangers, respectively; and
a controller which controls the plurality of indoor units,
wherein the plurality of indoor units include a plurality of air-sending fans, respectively,
wherein at least one of the plurality of indoor units includes a refrigerant detection unit,
wherein the controller is configured to divide the plurality of indoor units into one or more groups,
wherein the controller is configured such that when refrigerant is detected by the refrigerant detection unit included in any of the plurality of indoor units, the controller causes the air-sending fans included in all the indoor units which belong to a same group as the indoor unit which includes the refrigerant detection unit which detects the refrigerant to be operated,
wherein the controller includes a plurality of indoor-unit control units which control the plurality of indoor units,
wherein at least one of the plurality of indoor-unit control units includes a control board to which the refrigerant detection unit is non-detachably connected and a non-volatile computer memory which is provided on the control board,
wherein the nonvolatile computer memory includes a leakage history memory area configured to store one of first information indicating that no refrigerant leakage history is present and second information indicating that a refrigerant leakage history is present,
wherein the information stored in the leakage history memory area is changeable only one way from the first information to the second information, and
wherein the controller is configured such that when refrigerant is detected by the refrigerant detection unit included in at least one of the plurality of indoor-unit control units, the controller changes the information stored in the leakage history memory area of the indoor-unit control unit which detects the refrigerant, from the first information to the second information.

2. The refrigeration cycle apparatus of claim 1, further comprising an operational controller configured to allow an operation for dividing the plurality of indoor units into one or more groups to be performed.

3. The refrigeration cycle apparatus of claim 1,
wherein the controller is configured such that when the information stored in the leakage history memory area of at least one of the plurality of indoor-unit control units is changed from the first information to the second information, the controller causes the air-sending fans included in all the indoor units which belong to a same group as the indoor unit associated with the leakage history memory area of the at least one indoor-unit control unit to be operated.

4. A refrigeration cycle apparatus comprising:
a plurality of refrigeration cycle circuits each including at least one load-side heat exchanger;
a plurality of indoor units which accommodate the load-side heat exchangers of the plurality of refrigeration cycle circuits, respectively; and
a controller which controls the plurality of indoor units,
wherein each of the plurality of indoor units includes an air-sending fan,
wherein at least one of the plurality of indoor units includes a refrigerant detection unit,
wherein the controller is configured to divide the plurality of indoor units into one or more groups,
wherein the controller is configured such that when refrigerant is detected by the refrigerant detection unit included in any of the plurality of indoor units, the controller causes the air-sending fans included in all the indoor units which belong to a same group as the indoor unit which includes the refrigerant detection unit which detects the refrigerant to be operated,
wherein the controller includes a plurality of indoor-unit control units which control the plurality of indoor units,
wherein at least one of the plurality of indoor-unit control units includes a control board to which the refrigerant detection unit is non-detachably connected and a non-volatile computer memory which is provided on the control board,
wherein the nonvolatile memory includes a leakage history memory area configured to store one of first information indicating that no refrigerant leakage history is present and second information indicating that a refrigerant leakage history is present,
wherein the information stored in the leakage history memory area is changeable only one way from the first information to the second information, and
wherein the controller is configured such that when refrigerant is detected by the refrigerant detection unit included in at least one of the plurality of indoor-unit control units, the controller changes the information stored in the leakage history memory area of the indoor-unit control unit which detects the refrigerant, from the first information to the second information.

5. The refrigeration cycle apparatus of claim 4, further comprising an operational controller configured to perform an operation for dividing the plurality of indoor units into one or more groups.

6. The refrigeration cycle apparatus of claim 4,
wherein the controller is configured such that when the information stored in the leakage history memory area of at least one of the plurality of indoor-unit control units is changed from the first information to the second information, the controller causes the air-sending fans included in all the indoor units which belong to a same group as the indoor unit associated with the leakage history memory area of the at least one indoor-unit control unit to be operated.

* * * * *